United States Patent
Einarsson et al.

(10) Patent No.: US 9,003,041 B2
(45) Date of Patent: Apr. 7, 2015

(54) MULTIMEDIA SESSION MANAGEMENT

(75) Inventors: Torbjörn Einarsson, Stockholm (SE);
Anders Nohlgren, Luleå (SE); Magnus Westerlund, Kista (SE); Magnus Andersson, Spånga (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1200 days.

(21) Appl. No.: 11/666,891

(22) PCT Filed: Nov. 24, 2005

(86) PCT No.: PCT/SE2005/001768
§ 371 (c)(1),
(2), (4) Date: May 3, 2007

(87) PCT Pub. No.: WO2006/057606
PCT Pub. Date: Jun. 1, 2006

(65) Prior Publication Data
US 2007/0266122 A1    Nov. 15, 2007

(30) Foreign Application Priority Data
Nov. 25, 2004  (SE) .................................... 0402876-7

(51) Int. Cl.
*G06F 15/16* (2006.01)
*H04N 21/6408* (2011.01)
*H04N 21/438* (2011.01)
*H04N 21/643* (2011.01)

(52) U.S. Cl.
CPC ....... *H04N 21/6408* (2013.01); *H04N 21/4383* (2013.01); *H04N 21/4384* (2013.01); *H04N 21/643* (2013.01)

(58) Field of Classification Search
USPC ............... 709/203, 227, 231, 230, 217, 220
See application file for complete search history.

(56) References Cited

U.S. PATENT DOCUMENTS 6,185,602 B1 *  2/2001  Bayrakeri ..................... 709/204
6,188,398 B1 *  2/2001  Collins-Rector et al. ....... 725/37
(Continued)

FOREIGN PATENT DOCUMENTS

EP    1 333 639        8/2003
JP    2004-252884 A    9/2004
(Continued)

OTHER PUBLICATIONS

SMIL; "Synchronized Multimedia Integration Language";Jun. 15, 1998; W3C Recommendation; v 1.0; pp. 1-41.*
(Continued)

*Primary Examiner* — Oleg Survillo
(74) *Attorney, Agent, or Firm* — Nixon & Vanderhye, P.C.

(57) ABSTRACT

A multimedia provider (100) generates, based on a request for a media channel from a user terminal (10), a session set-up description that is returned to the user terminal (10). The description defines, when processed in the terminal (10), a session window (20) that is displayed on a screen (12) of the terminal and comprises a region (22) for displaying media data of a requested channel and a channel region (24) comprising information on alternative available media channels. The description also defines a binding between user inputs (14) of the terminal (10) and identifiers of the alternative channels. The set-up description allows for a user-friendly channel switch by automatically transmitting a channel switch request to the multimedia provider (100) upon a triggering of the user input (14) that is associated with the identifier of the requested media channel. The description, thus, provides a visually appealing graphical interface and simultaneously allows for a user-friendly media channel switch.

37 Claims, 10 Drawing Sheets

(56) References Cited

U.S. PATENT DOCUMENTS

| | | | |
|---|---|---|---|
| 6,195,680 B1* | 2/2001 | Goldszmidt et al. | 709/203 |
| 6,278,878 B1* | 8/2001 | Noda | 455/436 |
| 6,539,481 B1 | 3/2003 | Takahashi et al. | |
| 6,704,790 B1* | 3/2004 | Gopalakrishnan | 709/231 |
| 6,769,127 B1* | 7/2004 | Bonomi et al. | 725/39 |
| 6,771,644 B1 | 8/2004 | Brassil et al. | |
| 7,394,807 B2 | 7/2008 | Hamiti et al. | |
| 7,571,244 B2* | 8/2009 | Costanzo et al. | 709/231 |
| 7,630,328 B2 | 12/2009 | Wright et al. | |
| 7,724,691 B2 | 5/2010 | Mela et al. | |
| 7,852,859 B2 | 12/2010 | Wengrovitz et al. | |
| 2002/0124262 A1 | 9/2002 | Basso et al. | |
| 2002/0141740 A1* | 10/2002 | Matsui | 386/111 |
| 2004/0056985 A1 | 3/2004 | Seong | |
| 2004/0073629 A1 | 4/2004 | Bazot et al. | |
| 2004/0088741 A1 | 5/2004 | Tsai et al. | |
| 2004/0258066 A1* | 12/2004 | Chen et al. | 370/390 |
| 2005/0080904 A1* | 4/2005 | Green | 709/227 |
| 2005/0183120 A1* | 8/2005 | Jain et al. | 725/46 |
| 2006/0242664 A1 | 10/2006 | Kikkawa et al. | |
| 2006/0253599 A1 | 11/2006 | Monteiro et al. | |
| 2007/0168534 A1 | 7/2007 | Hiltunen et al. | |
| 2009/0319672 A1* | 12/2009 | Reisman | 709/227 |

FOREIGN PATENT DOCUMENTS

| | | |
|---|---|---|
| JP | 2004-312412 A | 11/2004 |
| WO | 02/07440 A2 | 1/2002 |
| WO | 02/09009 | 1/2002 |
| WO | 2004/021668 A1 | 3/2004 |
| WO | 2006/057606 A1 | 6/2006 |
| WO | 2006/096104 | 9/2006 |

OTHER PUBLICATIONS

International Search Report of PCT/SE2005/001768, mailed Apr. 3, 2006.
Realnetworks: "realplayer plus—Realplayer 8 Plus User Manual", Realnetworks, [Online] 2000, pp. 1-106, XP002371294.
Henning Schulzrinne, "Internet Media-on-Demand: The Real-Time Streaming Protocol", Dept. of Computer Science, Columbia University, Dec. 4, 2001, pp. 1-50, XP002371295.
International Preliminary Report on Patentability mailed Jul. 4, 2007 in corresponding PCT application PCT/SE2005/001768.
English translation of the Chinese Office Action mailed May 8, 2009 in corresponding Chinese application 200580047129.7.
European Office Action dated Nov. 27, 2009 (7 pages).
3GPP TS 26.234 v7.1.0; 3$^{rd}$ Generation Partnership Project; Technical Specification group Services and System Aspects; Transparent end-to-end Packet-switched Streaming Service (PSS); Protocols and codecs (Release 7), Dec. 2006 (130 pages).
H. Schulzrinne et al.; Network Working Group, Request for Comments: 2326, Apr. 1998, Real Time Streaming Protocol (RTSP) (82 pages).
J. Rosenberg et al.; Network Working Group, Request for Comments: 3261, Jun. 2002, SIP: Session Initiation Protocol (237 pages).
M. Handley et al.; Network Working Group, Request for Comments: 2327, Apr. 1998, SDP: Session Description Protocol (38 pages).
Ericsson, 3, NEC: "Fast Channel Switching for PSS based Mobile TV", 3GPP TSG-SA4#40, Aug. 28-Sep. 1, 2006, Tdoc S4-060454 (3 pages).
Ericsson, Use-Case and Requirements for "Fast Channel Switching", 3GPP TSG-SA4 PSM Adhoc, Oct. 20, 2006, Tdoc S4-AHP301 (4 pages).
International Search Report for PCT/SE2007/050795 mailed Apr. 2, 2008 (4 pages).
Office Action mailed Mar. 31, 2010 in related U.S. Appl. No. 11/826,026 (8 pages).
Office Action mailed Oct. 6, 2010 in related U.S. Appl. No. 11/826,026 (8 pages).
Office Action mailed Mar. 21, 2011 in related U.S. Appl. No. 11/826,026 (8 pages).

\* cited by examiner

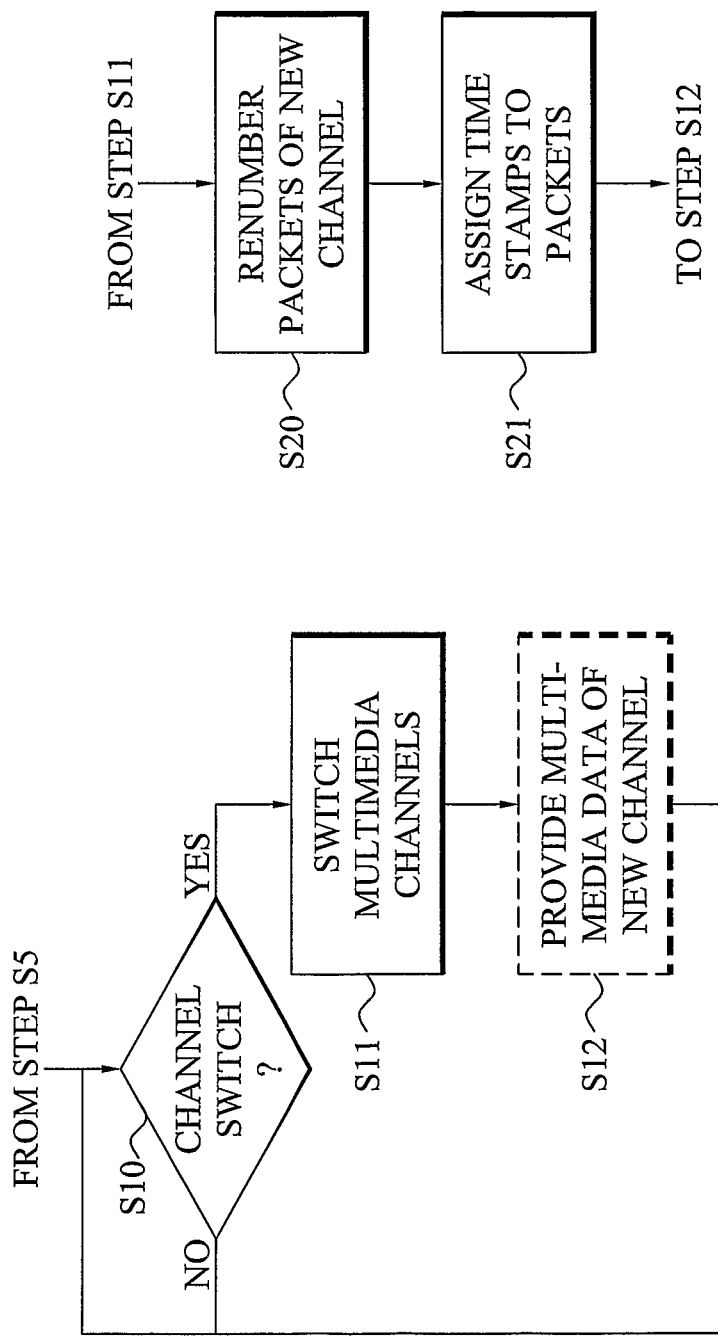

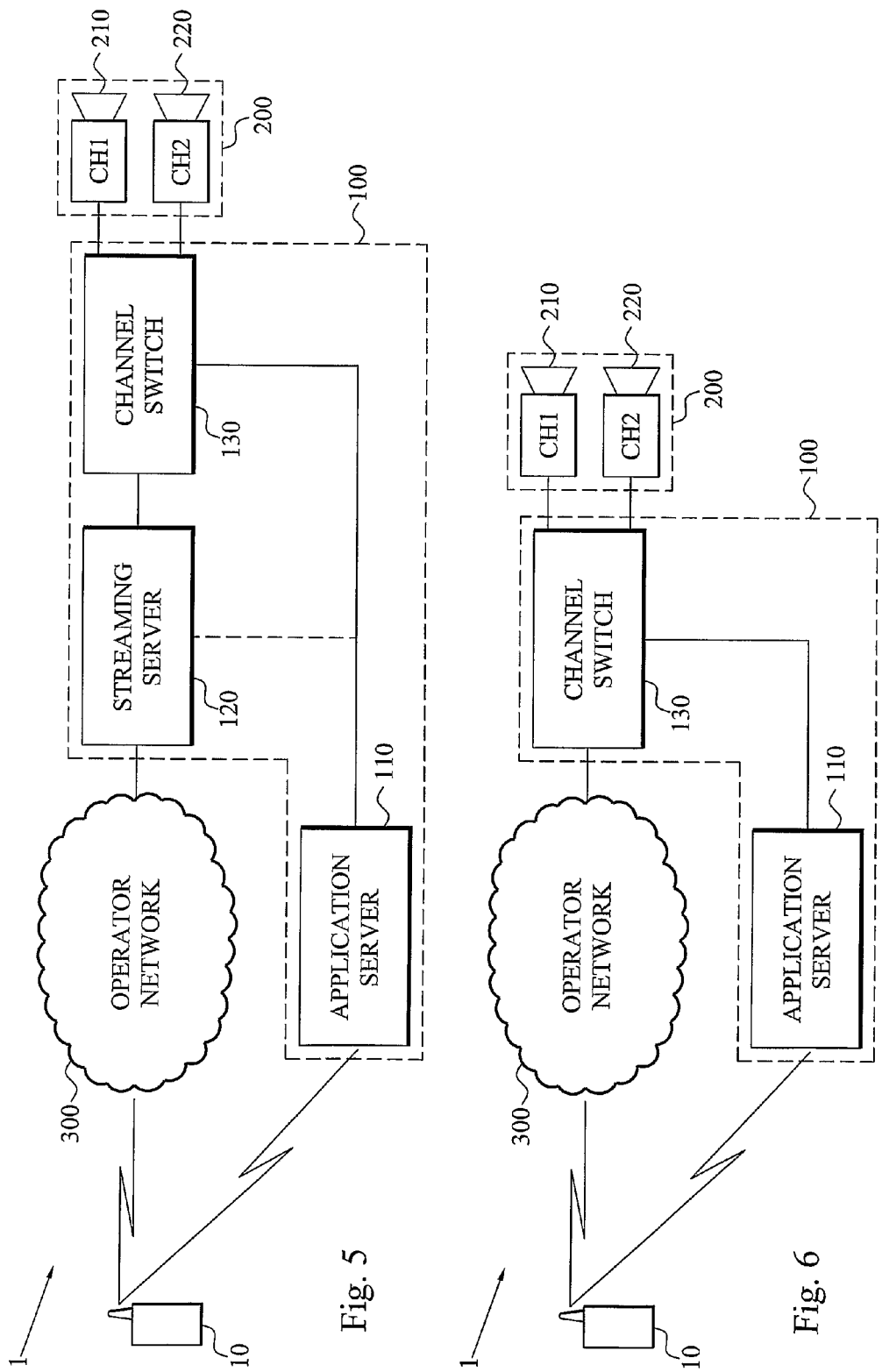

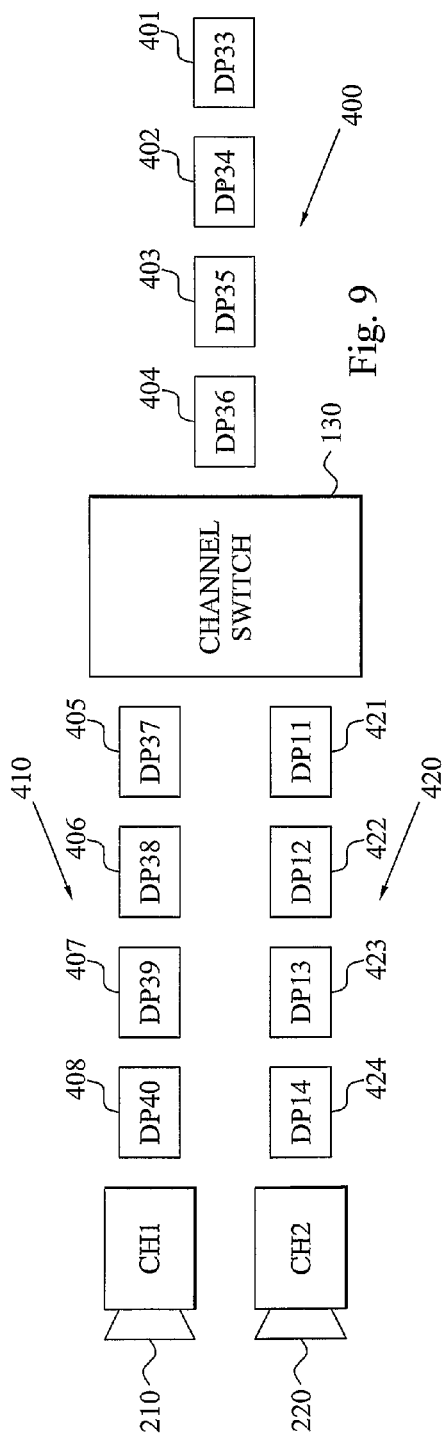

MULTIMEDIA SESSION MANAGEMENT

This application is the U.S. national phase of international application PCT/SE2005/001768, filed 24 Nov. 2005, which designated the U.S. and claims priority of SE 0402876-7, filed 25 Nov. 2004, the entire contents of each of which are hereby incorporated by reference.

TECHNICAL FIELD

The present invention generally relates to multimedia session management in communications systems, and in particular to such a session management that allows a smooth and user-friendly switch of multimedia channels.

BACKGROUND

It has become a trend to offer and provide a vast range of new services in existing mobile networks and mobile communications systems. There is currently a very big interest in using mobile networks for multimedia or TV content. This is often referred to as Mobile-TV in the art. The goal for Mobile-TV applications is to offer a TV-like experience where the user can choose and easily zap between different multimedia or TV channels.

Ordinary TV channels are broadcasted to many users and typically the user can choose which channel to receive and view. Mobile-TV is similarly about delivering a set of (live) media or multimedia streams to several end-users. Each multimedia stream corresponds to a TV-channel, and each user shall be able to choose which channel to view. At the moment, broadcast/multicast delivery methods for Mobile-TV are under development. Examples of such standardisation efforts are 3GPP Multimedia Broadcast/Multicast Services (MBMS) and European Telecommunications Standards Institute (ETSI) Digital Video broadcasting-Handheld (DVB-H). These will be similar to traditional TV, in their broadcast distribution fashion.

In the meantime, until Mobile-TV based on multicast/broadcast is available, there is a need for solutions that can be implemented over existing mobile transport channels. It will also later be of big interest for cells with few users and for networks with enough capacity, where unicast transport is the preferred distribution means.

A mobile TV-like service using streaming over Internet Protocol (IP) based networks can be implemented into existing mobile networks. An example is the Packet-Switched (PS) Streaming Service (PSS) developed in 3GPP. In order to start such a multimedia or TV session, a user typically surfs to a web page or portal and clicks on or selects a link to look at a live-streaming channel.

There also exist several proprietary streaming solutions that could be used for Mobile-TV, e.g. RealNetwork's streaming solution, Apple's Quicktime and Microsoft's media player. These also typically have a portal or web page where a link is clicked to start receiving a certain channel.

One of the goals of Mobile-TV services is to make it possible to zap between channels, as one can do for ordinary broadcasted TV channels. If all channels are broadcasted, the receiver can locally choose between channels by choosing the appropriate transport channel and using an appropriate demultiplexer. This is the case for standard cable, satellite or terrestrial television as well as the upcoming mobile standards MBMS and DVB-H. However, for unicast sessions, the client must instead influence a "server" or multimedia provider to send the desired channel.

For the PS-streaming technique based on PSS, there is currently no simple solution for channel switching. The traditional way of doing IP-based mobile streaming is to choose a specified content in a browser. This starts the download of a Session Description Protocol (SDP) or a Synchronized Multimedia Integration Language (SMIL) file, which in turns initiates a Real Time Streaming Protocol (RTSP) streaming session in a media player of a user terminal. The approximate time it takes until a user sees the content on the screen of the user terminal is around ten seconds of which maybe five seconds is application setup and the rest is signalling (around two seconds) and buffering (around three seconds). If the user wants to switch to another "multimedia or TV channel", he must stop the current data stream and go back to the browser where he chooses another channel by clicking a link. Then, a new RTSP session is started, the media player initiates and starts to buffer, and there is a new delay of ten seconds.

SUMMARY

There is, thus, a need for providing a smooth and user-friendly multimedia or TV channel switch solution in unicast (packet-switched) networks and communications systems that does not require visiting a multimedia provider's web site or portal and does not require a long delay before multimedia data is delivered to the user.

The present invention overcomes these and other drawbacks of the prior art arrangements.

It is a general object of aspect(s) of the present invention to provide a user-friendly multimedia channel switch solution for users participating in a multimedia session.

It is another object of aspect(s) of the invention to provide a graphical interface for presenting multimedia data that is visually attractive and comprises information required by the user for selecting alternative multimedia channels.

Yet another object of aspect(s) of the invention is to provide a TV-like experience with zapping possibilities in a user terminal using standard protocols and codecs in a unicast communications system.

Briefly, an aspect of the present invention involves setting-up and managing a multimedia session in a unicast-based communications system. In particular, the aspect relates to a multimedia session set-up description that provides a user-friendly, fast and efficient zapping and switch between available multimedia channels during the ongoing session.

A user that would like to watch a multimedia channel available from a content or multimedia provider, sends a request for this multimedia channel to the provider. This channel request is typically generated by the user visiting a web page of the multimedia provider and clicking on a link associated with the multimedia channel. The multimedia provider then automatically generates a multimedia session set-up description according to an inventive aspect. This set-up description comprises all the information, objects and instructions that the user terminal needs for providing a visually appealing presentation of the requested multimedia data and also a presentation of alternative channels, movies and programs that are available from the multimedia provider. The set-up description further enables a user-friendly switch to any of these alternative channels without requiring the user to end the ongoing session and anew visit the multimedia provider's web page.

A user that would like to watch a multimedia channel available from a content or multimedia provider, sends a request for this multimedia channel to the provider. This channel request is typically generated by the user visiting a web page of the multimedia provider and clicking on a link associated with the multimedia channel. The multimedia provider then automatically generates a multimedia session set-up description according to the invention. This set-up description comprises all the information, objects and instructions that the user terminal needs for providing a visually appealing presentation of the requested multimedia data and also a presentation of alternative channels, movies and programs that are available from the multimedia provider. The set-up description further enables a user-friendly switch to any of these alternative channels without requiring the user to end the ongoing session and anew visit the multimedia provider's web page.

The generated set-up description is returned to the user terminal, where the included data objects of the description are processed by the terminal. Firstly, a multimedia object of the description defines, when processed in the terminal, a multimedia session window that is displayed on a screen or graphical user interface (GUI) in the terminal. This session window includes a display region adapted for displaying multimedia (video) data of a requested channel. The window further includes a displayable channel region that includes information on the alternative multimedia channels available from the provider. This information could e.g. be identifiers or icons of the TV-programs or movies that are currently available on these alternative channels. This means that the user will have access to information about all these different multimedia channels in the display screen already at the start of the session. As a consequence, the user does not have to end the session and anew visit the multimedia provider's web page to obtain this kind of information.

The session window may optionally also include an information region that comprises information on the multimedia provider. An optional title region of the session window comprises information on the multimedia channel that the user currently is watching, e.g. by specifying the assigned name of the channel and/or the title of the movie or TV-program that is currently sent on this channel.

An association object of the session set-up description defines, when processed in the terminal, an association or binding between user inputs of the terminal and identifiers of the alternative channels, which are announced in the channel region of the session window. The user inputs that are associated with the channel identifiers can e.g. be keys of a keypad in the terminal or portions of a touch sensitive screen. A request object of the set-up description generates, upon a user-triggering of one of the user inputs, a request for the alternative channel, the identifier of which is associated with the triggered user input. This channel switch request is then automatically transmitted to the multimedia provider that performs the channel switch without any more intervention from the user.

In other words, when the user wants to switch multimedia channel he/she e.g. simply pushes one of the keys on the user terminal that has been assigned for this channel. The channel region, in addition to listing information on the available alternative channels, preferably also identifies those keys (user inputs) that have been assigned to the alternative channels. When the relevant key is pushed, the request object compiles the channel switch request. This switch request comprises the identifier of the requested channel which is obtained through the key binding provided by the association object. In addition, the request comprises an identifier of the user terminal in order to allow the multimedia provider to identify the relevant terminal. This user terminal identifier could be e.g. a Universal Resource Identifier (URI), an Internet Protocol (IP) address or at least one IP port of the user terminal. Alternatively, the terminal identifier is a unique user terminal identifier assigned by the multimedia provider and included in the session set-up request transmitted to the user terminal.

This means that the only procedure that the user needs to perform to switch multimedia channel during a session according to the invention is to, by means of the displayed channel region, identify which user input (key) that is associated with and assigned to the desired channel and then activate this user input. This should be compared to the prior art solutions for unicast systems, in which the user first have to end the current session, anew visit the provider's web page to select and click on the link to the desired multimedia channel. Thereafter a new session set-up procedure has to be performed, leading to a very time-consuming and cumbersome channel switch procedure.

When the multimedia provider receives the channel switch request of the inventive aspect, it identifies the new desired channel by means of the included channel identifier and then directs the multimedia data flow of this new channel to the correct user terminal using the included terminal identifier.

In a preferred embodiment of the invention, the change of multimedia channels is preferably performed in a seamless and a transparent manner for the user terminal. This means that multimedia provider, during the switch, provides multimedia data of the previous and the new channel as a continuous data stream to the user terminal. As a consequence, a first part of this data stream will comprise multimedia data of the previous channel, whereas a subsequent second part of the stream contains data of the new multimedia channel. Furthermore, the multimedia data is preferably transmitted as data packets from the multimedia provider to the user terminal. Each such data packet is typically associated with a sequence number and time stamp. In order to further enhance the seamlessness of the channel switch, the multimedia provider preferably assigns, following the switch, sequence numbers to the data packets comprising multimedia data of the new channel so that the sequence numbering of the data packet stream will remain continuous and contiguous. In addition, also time stamps are assigned to obtain a continuous time stamping despite the exchange of multimedia sources and channels.

The multimedia data could contain video and audio data that are provided in separate streams. In order to avoid audio play out degradations in the user terminal, the time stamp increase for the audio packets is preferably kept constant even at the channel switch. This gives rise to a slight time displacement between the incoming time and the outgoing time. The time stamping of the video packets are adjusted in the same way but based on the audio time stamping so as to keep the synchronization. In this context, audio data is the master and should be switched before the video data.

Furthermore, the synchronization source (ssrc) of the data packets is preferably set constant to give the impression for the user terminal that the data packets are transmitted as one continuous stream even though a channel switch has been performed.

The session set-up description according to an aspect of the present invention can advantageously be generated in a Synchronized Multimedia Integration Language (SMIL). In such a case, the association object can utilize the accesskey binding provided by SMIL to bind a user input with an alternative channel identifier. However, other languages including HyperText Markup Language (HTML) and Extensible Markup Language (XML) could alternative be employed. The session set-up description can also be Java-based, e.g. in the form of a Java midlet or applet. Further examples include a Session Initiation Protocol (SIP) or Message Session Relay Protocol (MSRP) based description.

The multimedia provider according to an aspect of the invention can be regarded as composed of different internal units, i.e. an application server, a streaming server and a channel switch. The application server is then responsible for receiving channel requests and channel switch requests from the user terminals and in turn returns session set-up descriptions. The application server further assigns ports to the different multimedia session and notifies them to the other units. The channel switch has access to the different multimedia channels and sources and performs the actual switch of the sources upon a command from the application server. The switch preferably also manages packet renumbering and time stamping. The streaming server is responsible for forwarding multimedia data from the switch to the user terminal and is also involved in negotiating the session set-up with the terminal. In such a system, the channel switch performed according to an aspect of the invention will be completely transparent to both the streaming server and the user terminal. The terminal identifier will then be used by the application server, channel switch and streaming server as not only identifier of the actual user terminal but also as identifier of the current multimedia session.

The invention offers at least the following advantages:
- Provides a TV-like experience with zapping possibilities on a user terminal during an ongoing multimedia session in a unicast communication system;
- Provides a user-friendly, seamless and transparent channel switch for the user terminal using standard protocols and codecs;
- Provides a richer and visually appealing user interface; and
- A same multimedia session is reused during a channel switch so that no time-consuming and cumbersome set-up of a new session over the radio link has to take place.

Other advantages offered by the present invention will be appreciated upon reading of the below description of the embodiments of the invention.

SHORT DESCRIPTION OF THE DRAWINGS

The invention together with further objects and advantages thereof, may best be understood by making reference to the following description taken together with the accompanying drawings, in which:

FIG. 3 is a flow diagram illustrating an example of additional steps of the method in FIG. 1, which provide a switch of multimedia channels during the multimedia session;

FIG. 4 is a flow diagram illustrating an example of the additional step of the method in FIG. 3;

FIG. 5 is a schematic overview of an embodiment of a communications system according to the present invention;

FIG. 6 is a schematic overview of another embodiment of a communications system according to the present invention;

Figure 11:
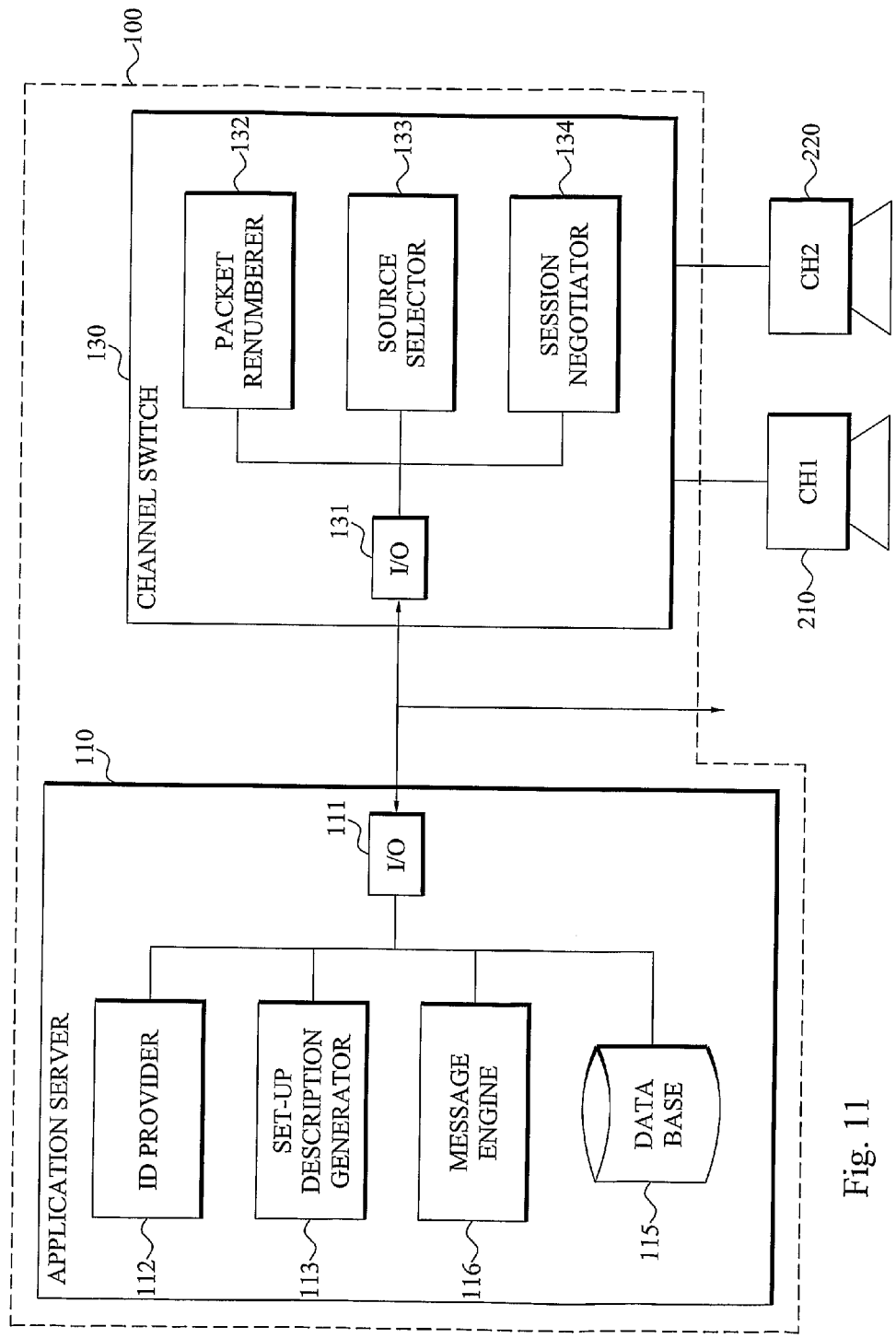
Figure 12:
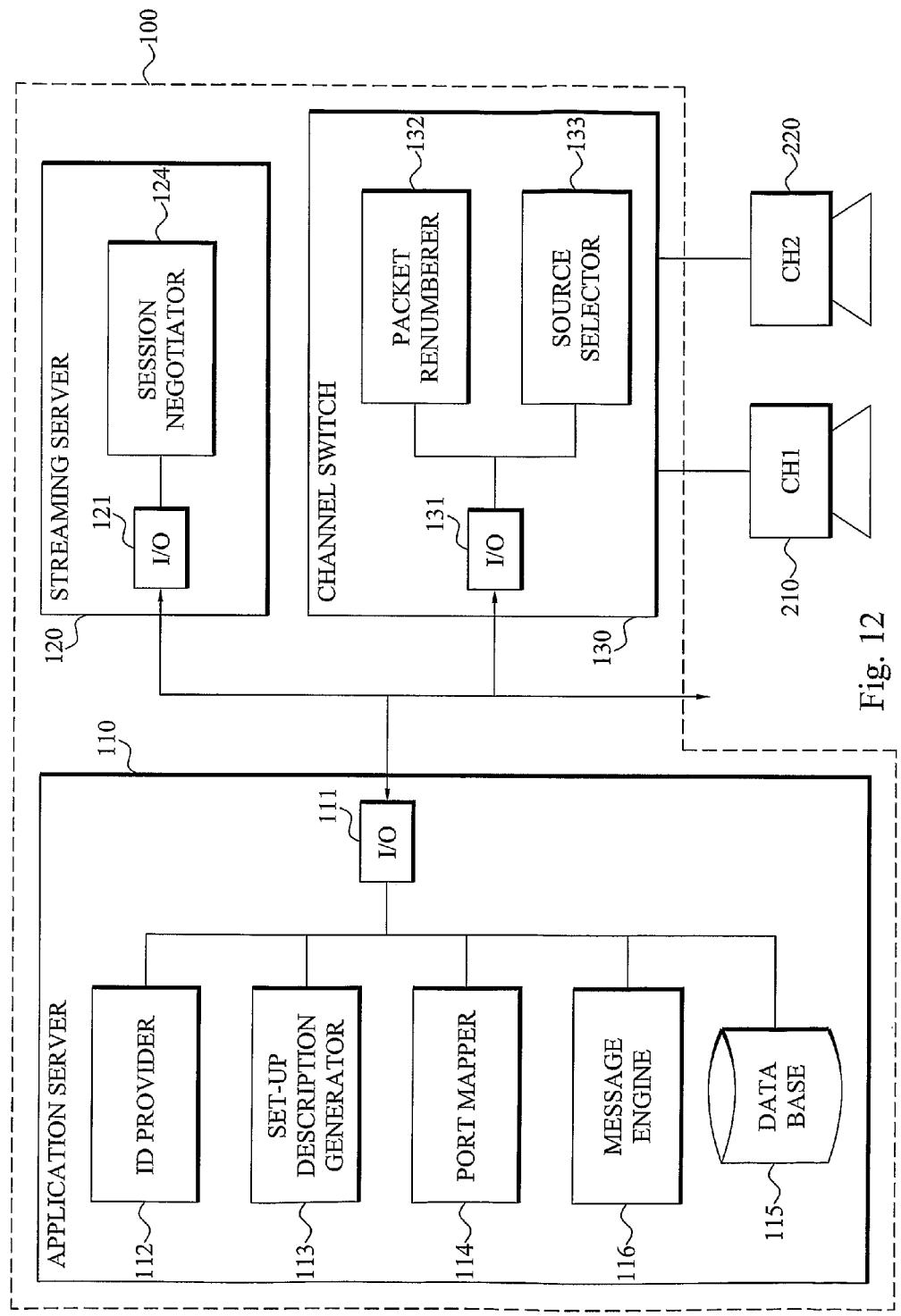
Figure 13:
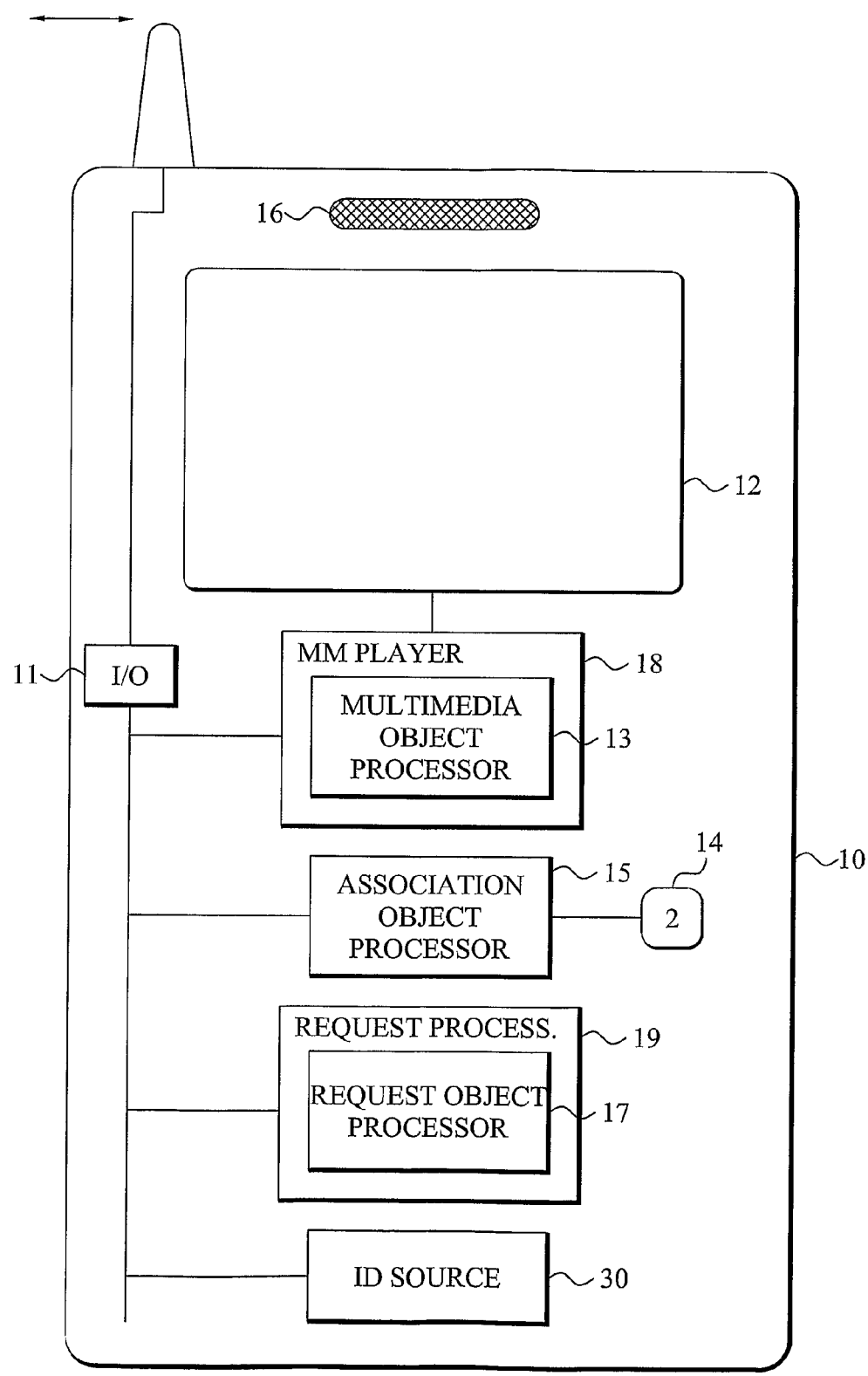

FIGS. 9 and 10 schematically illustrate an example renumbering of data packets during a channel switch according to the present invention;

FIG. 11 schematically illustrates a block diagram of an embodiment of network units that include multimedia session set-up and managing arrangements according to the present invention;

FIG. 12 schematically illustrates a block diagram of another embodiment of network units that include multimedia session set-up and managing arrangements according to the present invention; and FIG. 13 schematically illustrates a block diagram of a user terminal according to an embodiment of the present invention.

DETAILED DESCRIPTION

Throughout the drawings, the same reference characters will be used for corresponding or similar elements.

The present invention relates to management of multimedia sessions in communications systems and in particular to setting-up such a multimedia session and managing a switch of multimedia sources during the ongoing session.

An aspect of the present invention provides a TV-like experience similar to the current ordinary TV system and the forthcoming multicast/broadcast based mobile-TV but in unicast-based communications system. The teachings of the present invention can be applied to any such unicast system and in particular wireless communications systems that employ the Internet Protocol, IP, for data communication. A typical example of such a communications system is a packet switched (PS) system that provides multimedia data to connected users through PS streaming (PSS).

As a consequence, the present invention, among other things, allows a user participating in a multimedia session to switch between different multimedia channels in a manner similar to ordinary TV systems and the broadcast/multicast-based mobile-TV systems but in a unicast communications system. This means that the channel switch will, from the user point of view, be much more smoothly experienced, will be performed in a shorter period of time and does not require visiting a multimedia provider's Web page nor setting up a new multimedia session, as the prior art unicast solutions require. The present invention further provides a much richer and more visually appealing user interface.

Multimedia data according to the present invention includes any form and type of media and multimedia that can be rendered and displayed at a user terminal. This includes, but is not limited, to images, video, audio and other media types that are capable of being perceived, during rendering, by a user.

Figure 1:
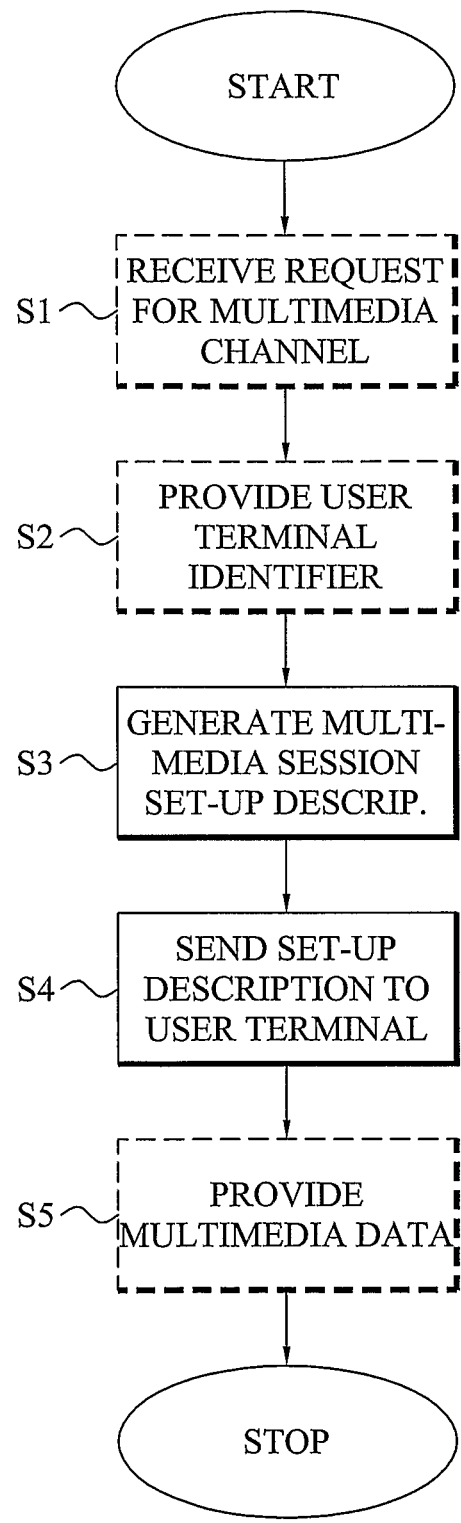
FIG. 1 is a flow diagram illustrating a method of setting-up a multimedia session according to an aspect of the present invention.

FIG. 1 is a flow diagram of an example method of setting up a multimedia session in a unicast-based communications system according to the present invention. The method starts in the optional step S1, in which a multimedia provider receives a request for a multimedia or media channel (TV channel) from a user terminal.

This channel request can be performed according to prior art techniques as described in the background section. Briefly, the user visits, by means of a Web browser or similar application in his/her user terminal, a web page of the multimedia provider and selects a desired multimedia channel, e.g. by clicking on a link. Alternatively, the user terminal can include an application that, when activated, automatically accesses or connects with the multimedia provider for allowing the user to select the relevant channel.

The user terminal could insert an identifier of the user terminal in the request for the multimedia channel, which is illustrated by the next step S2. Alternatively, the user terminal identifier could be sent separately from the channel request as long as the multimedia provider can associate the user terminal identifier with the corresponding channel request.

Different user terminal identifiers can be employed according to the present invention. For example, the terminal identifier could be a Universal Resource Identifier (URI) or an IP address assigned to the user terminal. Other possible examples include at least one port of the user terminal and then preferably an input port of the user terminal to which multimedia data of the requested channel should be delivered. The terminal identifier could also be an identifier associated with a service agreement between the user and a network operator or another service provider, e.g. the multimedia provider.

In an alternative implementation of the step S2, the multimedia provider provides, based on the reception of the channel request from the user terminal, the identifier of the user terminal. For example, the multimedia provider has access to a set or pool of possible user terminal identifiers that can be assigned to users participating in a multimedia session. In such a case, the multimedia provider selects, in step S2, one of the identifiers from the set or pool that is currently not employed by any other user terminal that also is involved in a multimedia session with the multimedia provider. This means that the multimedia provider will re-use the identifiers of the pool. The total number of identifiers in the pool should be large enough to cope with an expected amount of user terminals simultaneously receiving multimedia data.

It is anticipated by the present invention that the multimedia provider could, alternatively, generate a new terminal identifier on the fly upon reception of the channel request and use for the requesting user terminal. It is evident that the identifier of the user terminal should preferably uniquely identify the user terminal in order reduce the risk of mixing up different user terminals. As a consequence, a provider-generated user terminal identifier may be preferred in some applications since the multimedia provider then has control over the identifier assignment process and can prevent any mixing up of terminals.

The user terminal identifier will, typically, be employed by the multimedia provider as an identifier of the actual user terminal but also of the multimedia session involving this user terminal, which is disclosed further herein.

Once the channel request has been received, and preferably once the user terminal identifier has been received or generated, the multimedia provider generates a multimedia session set-up description or file in step S3. This session set-up description is preferably generated dynamically by the multimedia provider based on the received channel request and the provided terminal identifier. The description comprises multiple data objects or instructions that can be processed by the user terminal, once the description has been sent thereto. In a preferred implementation of the invention, the set-up description comprises a multimedia object, an association object and a request object. In a further preferred embodiment, the set-up description also comprises the user terminal identifier.

The multimedia object defines, when processed in the user terminal, a multimedia session window that is displayable in a graphical user interface of the user terminal. In other words, when the user terminal processes this multimedia object the multimedia session window will be displayed on the graphical user interface, which is typically a display screen or other equipment (including stand-alone equipment connected to the communicating equipment of the user terminal) for displaying information on the user terminal. The displayed multimedia session window comprises a multimedia display region adapted for displaying multimedia (video) data of a requested multimedia channel. The session window further comprises a displayable channel region that comprises and displays channel identifiers of alternative (currently non-requested) multimedia channels that are available from the multimedia provider. This session window, thus, provides an appealing graphical user interface that allows a user to watch a requested TV-program, movie or some other requested multimedia in the video display region. In addition, the channel region graphically informs the user of alternative TV-programs, movies, etc. that the user can switch to during the session.

Figure 2:
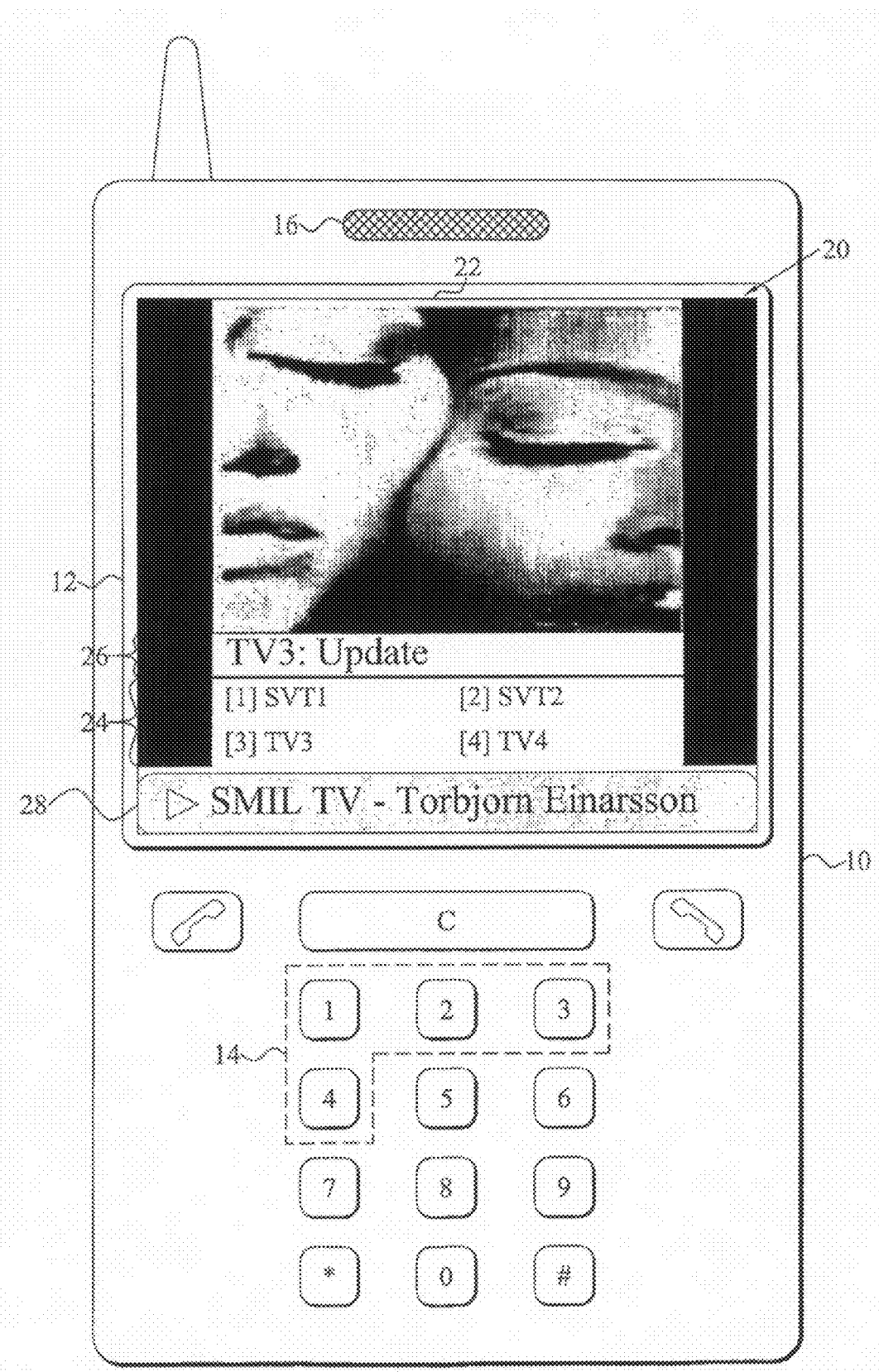
FIG. 2 is a schematic illustration of a user terminal displaying a multimedia session window according to an embodiment of the present invention.

FIG. 2 is a schematic block diagram of an embodiment of a user terminal 10 according to the present invention having a display screen 12, in which a multimedia session window 20 is displayed. The session window 20 comprises the multimedia display region 22, in which multimedia (video data) of a requested TV channels is currently displayed. The channel region 24 is clearly visible in the figure and has, non-limitedly, been provided below the multimedia display region 22. In this channel region 24 identifiers of alternative channels are displayed for the user. This region 24 could, as has been schematically done in the figure, display identifiers or icons of all the different multimedia (TV) channels available from the multimedia provider. This means that a user does not have to access the multimedia provider's web page to obtain this information since the multimedia object received in the session set-up description or documentation contains all this information.

The channel region 24 does not necessarily have to be displayed all the time on the display screen 12. In an alternative implementation, the multimedia display region 22 normally occupies the whole or at least a major portion of the display screen 10. In such a case, the channel region 24 will be displayed only when the user activates a certain user input, e.g. key on the user terminal 10 or portion of the display screen 12. In this implementation, the channel region 24 functions similar to a pop-up window and will only be fully visible when required by a user. The size of the multimedia display region 22 could (automatically) change between a full-screen (or near full-screen) size when the channel region 24 is not displayed and a smaller size when the channel region 24 is displayed. This means that the size of the multimedia display screen 22 is maximized in the two operation modes while still allowing display of the channel region 24 when required.

Also the size of the channel region 24 can be changed between a full size (as in the figure) displaying all channel information and a comparatively smaller size that could e.g. merely indicate the presence of the channel region 24 on the screen 12. The switch between these two modes (sizes) could be performed based on activation of a portion of the (touch sensitive) display screen 12, a key or another user input.

The (alternative) channel identifiers of the channel region 24 could be any form of graphical data. For example, the identifiers may be in the form of displayed text strings indicating the name of the multimedia data (TV-program, movie, etc.) available on the alternative channels. Alternatively, icons representing the alternative multimedia channels could be displayed in this channel region 24. The icons then preferably display well-known logos or other information allowing the user to identify the channels or the multimedia that is currently available on the alternative channels.

As is evident from the figure, the multimedia session window 20 could also include other window regions, including e.g. a displayable information region 26 that includes identifier or icon of the currently selected or requested multimedia channel. In addition, or alternatively, information, such as movie title, program title or information, of the actual multimedia data currently displayed in the multimedia display region 22 could be found in this information region 26.

A title region 28 could also be included in the multimedia session window 20 and can include information on the multimedia provider and/or source/owner of the displayed multimedia.

The association object, which is also a part of the multimedia session set-up, defines or provides, when processed in the user terminal 10, an association of a user input 14 of the user terminal with the channel identifiers of the alternative multimedia channels. Thus, this association object includes program codes or instructions that generate an association between user inputs 14 in the terminal 10 and the other multimedia channels that are available from the multimedia provider. This means that the association object provides an association or binding between the user inputs 14 and the identifiers of the alternative channels, the icons of which are displayed in the channel region 24. The channel region 24 then preferably also displays, for each channel icon/identifier, information on the user input 14 that is associated with the channel. This is clearly illustrated in FIG. 2, in which the channel region 24 includes information on four multimedia channels, denoted SVT1, SVT2, TV3 and TV4. The channel region 24 also includes identifiers of the user inputs 14 that have been assigned to these channels, i.e. key 1, key 2, key 3 and key 4 of the keypad.

A typical example of such an association provided by the association object is a key-binding between one of the keys 14 (user inputs) of the user terminal 10 and the identifier of an alternative multimedia channel. If, for example, the multimedia session set-up description is a Synchronized Multimedia Integration Language (SMIL) based description, the association object may utilize the accesskey binding provided by SMIL to bind a key 14 with an alternative channel identifier and thereby define which multimedia channel corresponds to what key 14.

The user input 14 that is involved in this binding or association can be any (software or hardware) user input 14 that can be arranged or implemented in the user terminal 10. A typical example is, as illustrated in the figure, a key 14 of a key pad arranged in the terminal 10. For user terminals 10 having touch sensitive screens 12, the user input 14 could constitute a portion of the screen 12. For example, the portion of the touch sensitive screen 12 being directly over the icons or channel identifiers presented in the channel region of the multimedia session window 20 could be employed as user inputs according to the present invention. Actually, any user input 14 that can be triggered or activated by a user can be utilized for this association provided by the association object of the invention.

The multimedia session set-up description also includes a request object that, when processed and implemented in the user terminal 10, generates a request for an alternative multimedia channel. This alternative channel request is generated when the user triggers or activates the user input 14 associated, through the association object, with the identifier of the requested alternative multimedia channel.

The channel switch request comprises an identifier of the requested alternative multimedia channel and the identifier of the user terminal 10. The latter could have been received from the multimedia provider together with the session set-up description. In such a case, the request object includes or has access to this user terminal identifier and inserts it in the channel request. If the user terminal identifier instead is stored in the user terminal 10, the request object fetches the identifier upon triggering of the user input 10 and includes it in the request.

In an example implementation of the present invention, channel identifier of an alternative channel can be in the form of a link to the multimedia provider. The association object is then implementable for binding or associating this special link with one of the user inputs (keys) 14 of the user terminal. When a user activates this particular user input, e.g. presses a key 14, the request object accesses the multimedia provider through the link associated with the triggered user input. The channel request will then include information allowing the multimedia provider to identify the requested multimedia channel that is associated with the triggered user input and allowing identification of the requesting user terminal 10, which is discussed further below. In such an implementation, the request object comprises a hyperlink pointing to the multimedia provider and the request for the alternative multimedia channel is a HyperText Transfer Protocol (HTTP) request that comprises the user terminal identifier and the channel identifier of the alternative channel.

The multimedia session set-up description according to the present invention, thus, provides a very user-friendly and visually appealing graphical user interface through the multimedia session window 20 generated based on the multimedia object in the set-up description. This session window 20 will, in addition to displaying the requested multimedia, also allow display of other relevant information for the multimedia session, i.e. information on alternative channels available from the multimedia provider and optionally information on the requested multimedia channel and the current multimedia data of this channel. Also information describing the multimedia provider can be displayed. This means that all data that can be of relevance for the user during the multimedia session is available in the user terminal already at the start-up of the session. This information is further continuously visually available on the display screen 12 or can at least be presented thereon, e.g. in the case of pop-up windows. As a consequence, the user does not have to end the ongoing session to re-visit the multimedia provider's web page in order to obtain information on the alternative available multimedia channels and TV-programs and movies.

Furthermore, the association object and the request object of the session set-up description provide simple and user-friendly means for switching multimedia channel during the session. The only activity the user has to perform is triggering one of the user input 14 in order to select a desired new multimedia channel. The association and request object then enables an automatic request of this new channel without requiring the user to first end the current session, visit the multimedia provider's web page and there select the desired new channel. The channel switch provided by the present invention is, thus, performed in a transparent manner for the user and can be completed in a much shorter period of time compared to the prior art channel switch solutions available in unicast systems.

Herebelow follows an illustrative, but non-limiting, example of a session set-up description according to the present invention that has been written in SMIL.

```
<?xml version="1.0"?>
<!DOCTYPE smil PUBLIC "-//W3C//DTD SMIL 2.0//EN"
"http://www.w3.org/2001/SMIL20/SMIL20.dtd">
<smil xmlns="http://www.w3.org/2001/SMIL20/Language">
    <head>
        <meta name="title" content="SMIL TV"/>
        <meta name="author" content="Torbjorn Einarsson"/>
        <layout>
            <root-layout id="SMIL_TV" backgroundColor="gray"
```

```
        width="176" height="200"/>
            <region id="video" left="0" width="176" height="144"/>
            <region id="prog" left="0" top="144" width="176" height="18"/>
            <region id="ctrl1" left="0" top="164" width="88" height="18"/>
            <region id="ctrl2" left="88" top="164" width="88" height="18"/>
            <region id="ctrl3" left="0" top="182" width="88" height="18"/>
            <region id="ctrl4" left="88" top="182" width="88" height="18"/>
        </layout>
    </head>
    <body id="SmilTV">
        <par id="ImageTextAudio" dur="indefinite">
            <video region="video" src="rtsp://smiltv.com/j09184j0ajk.sdp"/>
            <a href="http://smiltv.com/ch/j09184j0ajk/1.txt" target="prog"
accesskey="1">
                <text region="ctrl1" src="http://smiltv.com/ch1.txt"/></a>
            <a href="http://smiltv.com/ch/j09184j0ajk/2.txt" target="prog"
accesskey="2">
                <text region="ctrl2" src="http://smiltv.com/ch2.txt"/></a>
            <a href="http://smiltv.com/ch/j09184j0ajk/3.txt" target="prog"
accesskey="3">
                <text region="ctrl3" src="http://smiltv.com/ch3.txt"/></a>
            <a href="http://smiltv.com/ch/j09184j0ajk/4.txt" target="prog"
accesskey="4">
                <text region="ctrl4" src="http://smiltv.com/ch4.txt"/></a>
        </par>
    </body>
</smil>
```

The program code within head field above (lines 5-18 of the program code) belongs to the multimedia object and defines the multimedia session window 20. The root-layout field defines the title region 28 of the session window 20. Thereafter follows fields that define the multimedia display region 22, the information region 26 and the channel region 24. The video region field contains the RTSP (Real Time Streaming Protocol) URI that starts up the RTSP session.

The following code lines define examples of the association and request objects. In this schematic program code example, four multimedia channels are available from the multimedia provider "SMIL TV". The accesskey command provides an association between the four listed links and the four keys 14 numbered 1 to 4 in the user terminal 10. Note further that for each multimedia channel there is a link (http://smiltv.com/chX.txt, where X=1-4) to a source in the multimedia provider that provides the icon or information on the channel displayed in the channel region 24.

The links used in this illustrative example are generated so that they contain both the identifier of the user terminal 10 and the identifier of the relevant multimedia channel, i.e. they are in the form of http://smiltv.com/ch/userID/channelID.txt The user terminal identifier is also used in the RTSP URI that starts up the RTSP session.

It is anticipated by the present invention that the session set-up description may be generated in other languages than SMIL. Possible such other languages include the HyperText Markup Language (HTML) and Extensible Markup Language (XML). The session set-up description can also be Java-based, e.g. in the form of a Java midlet or applet. Further possible examples include a Session Initiation Protocol (SIP) and a Message Session Relay Protocol (MSRP) based description.

With reference anew to FIG. 1, once the multimedia provider has generated this multimedia session set-up description of the invention, it sends, in step S4, the description to the requesting user terminal, where the included objects will be processed. The multimedia provider subsequently, in step S5, provides multimedia data of the requested channel to the user terminal for display in the multimedia display region of the session window. The session has now been set-up and started and the method disclosed in the flow diagram of FIG. 1 ends.

It is anticipated by the present invention that the multimedia data displayed in the multimedia display region following the session start-up is typically data of the requested multimedia channel. In alternative implementations, the session set-up description could be configured for, when processed, in the user terminal instead displaying a default channel selected by the multimedia provider. Such a default channel could e.g. include a short description of the available services and channels, a short instruction video of how the session will be conducted, etc. The user can then switch to his/her desired multimedia channel at any time, once the session has been set up.

FIG. 3 is a flow diagram illustrating additional steps to the flow diagram of FIG. 1, which are performed during the ongoing multimedia session and especially during a channel switch. The method continues from step S5. In a next step S10, the multimedia provider listens for a channel switch request from the user terminal. The provider preferably continuously listens for such a request in order to process it immediately upon reception. If the channel switch is not time-critical from the user point of view, a periodic or intermittent switch request listening or detection could alternatively be employed.

As has been thoroughly discussed in the foregoing, a channel switch request can be (automatically) generated by the user terminal, through the association and request objects of the session set-up description, once the user triggers or activates a user input associated with the desired new channel. This channel switch request could be in the form of a HTTP request that is sent to the multimedia provider. The user terminal identifier of the request allows the multimedia provider to identify the current multimedia session and allows the provider to identify the ports to which the new multimedia data should be transmitted. The channel identifier of the request is used to identify the multimedia source from which the new multimedia data should be fetched. The actual channel switch of the present invention, which is discussed in more detail with reference to FIG. 8 below, is performed during the ongoing session, so no (RTSP) session teardown or new set-up has to be performed.

Furthermore, the switch is conducted in step S11 in a manner that is preferably transparent to the user terminal. This means that the multimedia data is transmitted to the user terminal as a continuous multimedia data stream. A first portion of this stream comprises multimedia data of the previous channel whereas the subsequent second portion of the stream comprises multimedia data of the new requested channel. In order to further support this seamless and transparent channel switch, the multimedia provider can renumber the sequence numbers and set time stamps to the data packets sent in the multimedia stream so that all data packets, including those containing multimedia data of the previous channel and the packets containing data of the new channel, have continuous sequence number and/or time stamps.

The multimedia data of the new channel is then provided in the next step S12 to the user terminal for display in the multimedia display region of the session window. The multimedia provider then continues to listen for a possible new channel switch from the user terminal in step S10.

FIG. 4 illustrates additional steps that are preferably performed by the multimedia provider of the invention during the channel switch. The method continues from step S11. In a next step S20, the multimedia provider renumbers the data packets of the new channel, following the channel switch, so that the sequence of data packets of the multimedia session has a continuous sequence numbering. This principle is illustrated in more detail in FIGS. 9 and 10. In FIG. 9, data packets 401 to 404 are delivered from a multimedia provider, which is schematically illustrated as a channel switch 130 in the figure, to a user terminal (not illustrated) in the form of a data stream 400. These data packets 401 to 404 originate from a given multimedia source 210 that represents a first multimedia channel according to the present invention. In this illustrative example, the channel switch 130 has access to two possible data sources 210, 220 and can, thus, offer two different multimedia channels to its connected user terminals. In FIG. 9, a first stream 410 of data packets 405 to 408 is received from the first data source 210 and a second stream 420 of data packets 421 to 424 is likewise received from the second source 220. Note the continuous sequence number of the data packets 401 to 408 and 421 to 424 in the different streams 400, 410, 420. The data packets 401 to 408 originating from the first data source 210 has a first sequence numbering ranging from DP33 to DP40 in the figure. The data packets 421 to 424 of the second source 220 have a second different sequence numbering from DP11 to DP14. In FIG. 10, a request of a channel switch from the first multimedia channel to the second multimedia channel has been received from the user terminal. This means that the data stream 400 output from the channel switch 130 will now, initially, contain data packets 405 to 407 of the previous multimedia channel and data packets 424 of the newly selected channel. In order to provide a continuous multimedia data stream 400 to the user terminal, the channel switch 130 renumbers the data packets 424 so that the data packets 405 to 407, 424 leaving the switch 130 and are sent to the same user terminal will have a continuous sequence numbering. This means that the data packet 424 of the new channel will be renumbered from DP14 to DP40 to keep the continuous numbering. The sequence renumbering is continued for the remaining data packets 425 to 428 of this new channel. Note that for the current session, no renumbering of the data packets 409 to 413 of the previous source is required since they will not be sent to the current user terminal.

In the next step S21 in FIG. 4, the multimedia provider assigns time stamps to the data packets in the multimedia stream to obtain a stream of data packets that have a continuous time stamping even during and after the channel switch. Similar procedures as for the sequence numbering disclosed above in connection with FIGS. 9 and 10 can be used for the time stamping of the data packets.

As is well known in the art, multimedia data may be in the form of video data and audio data. A multimedia channel that provides a multimedia stream can then be regarded as providing a video stream containing data packets comprising video data and an audio stream containing data packets comprising audio data. In such a case, the sequence numbering and time stamping according to the present invention is preferably performed on both of these data streams in order to obtain a continuous sequence numbering and time stamping of video data packets and audio data packets. In order to avoid audio play out degradations in the user terminal, the time stamp increase for the audio packets is preferably kept constant even at the channel switch. This gives rise to a slight time displacement between the incoming time and the outgoing time. The time stamping of the video packets are adjusted in the same way but based on the audio time stamping so as to keep the synchronization. In this context, audio data is the master and should be switched before the video data. In summary, the multimedia provider assigns time stamps to the audio data packets so that the audio data stream will have continuous time stamping and assign time stamps to the video data packets based on the time stamp assignment of the audio data packets.

Thus, in order to get minimal impact on the user terminal, the multimedia provider could create an output multimedia (Real-time Transport Protocol (RTP)) stream of (RTP) data packets having headers that have fixed payload type (ptype) and synchronization source (ssrc) as well as continuous sequence numbers and time stamps. The usage of fixed or constant ssrc gives the impression to the user terminal that the data packets are transmitted as one continuous data stream despite the fact that a channel switch actually has been performed. The multimedia provider could also create its own Real-time Transport Control Protocol (RTCP) flows and make sure that the synchronization information in RTCP sender reports makes the stream look continuous over a switch of multimedia channels.

However, it is also possible to make the multimedia provider change one or more fields to indicate to the user terminal that the content is coming from a new source, for example by changing the ssrc value or adding an optional contributing source (csrc) field that changes depending on multimedia channel.

The method then continues to step S12 of FIG. 3, where the multimedia data of the new channel is delivered to the user terminal.

FIG. 5 is a schematic overview of a unicast-based wireless communications system 1 according to an embodiment of the present invention. The communications system 1 basically includes a multimedia provider 100 that provides multimedia services and data to a user terminal 10 over an operator network 300 or some other wired or wireless network. The multimedia provider 100 comprises or, as is illustrated in the figure, has access to a multimedia source 200 that contains, generates or otherwise provides multimedia data from different channels 210, 220. In this illustrative example, the multimedia provider 100 has been disclosed as comprising three different units: an application server 110, a streaming server 120 and a channel switch 130. For such a division of the functionality of the multimedia provider into different (internal) units, the application server 110 is preferably responsible for the receiving channel requests and channel switch requests from the user terminal 10. The application server 110 also generates and transmits the session set-up description as a part of the session set-up procedure. The actual session set-up negotiation is typically conducted between the user terminal 10 and the streaming server 120. This server 120 further, during the ongoing session, delivers the multimedia data from the channel switch 130 to the user terminal 120. As is evident from its name, the channel switch 130 switches multimedia channels upon a command received from the application server 110. In this channel switch, multimedia data from a new multimedia channel or source 210, 220 is now instead delivered to the streaming server 120 for forwarding over the network 300 to the user terminal 10.

FIG. 5 should merely be seen as an illustrative example of a communications system 1 according to the present invention and other system layouts are possible and within the scope of the invention. For example, the number of available multimedia channels 210, 220 does not necessarily have to be two but could be any multiple number, i.e. at least two, of channels 210, 220. In addition, the multimedia provider 100 could be composed of one central or distributed unit that then handles the operations of the application server 110, the streaming server 120 and the channel switch 130. Alternatively, the multimedia provider 100 could include more or fewer internal units, which is schematically illustrated in FIG. 6.

In FIG. 6, the streaming server has been omitted so that the channel switch 130 directly forwards the multimedia data to the user terminal 10 over the (operator) network 300. As was briefly mentioned above, the multimedia provider 100 could instead include more units, e.g. a unit that is responsible for charging for the offered multimedia service. Alternatively, such a charging unit is provided elsewhere, e.g. as a part of the operator network infrastructure 300.

Figure 7:
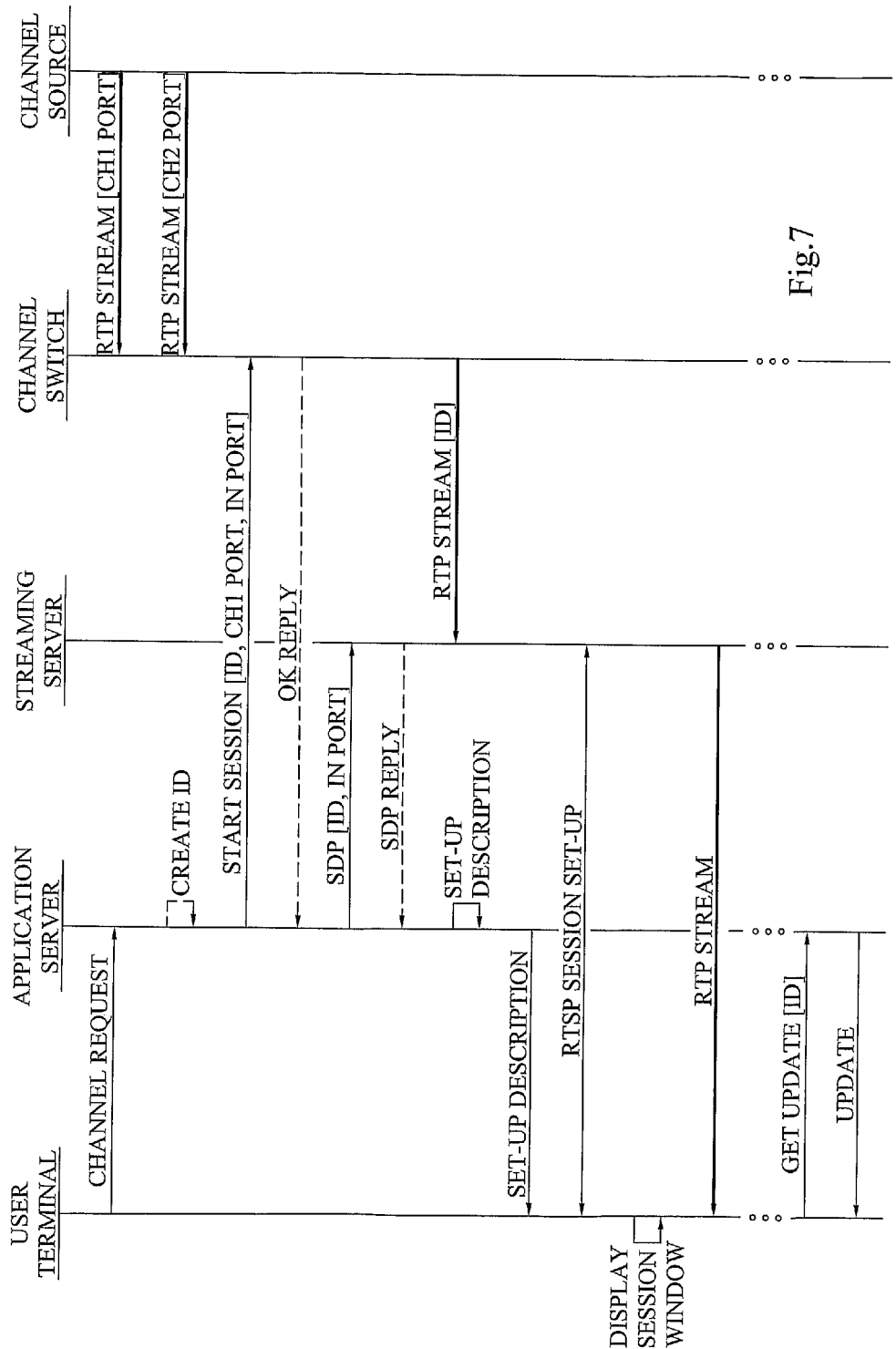
FIG. 7 is a signal diagram illustrating a multimedia session set-up according to an embodiment of the present invention.

FIG. 7 is a schematic signal diagram that illustrates some of the data signaling that is performed during a set-up of multimedia session according to the invention and during the actual ongoing session. In this signal diagram a communications system layout as illustrated in FIG. 5 has been assumed but the person skilled in the art clearly understands that the principles can, with slight non-inventive modifications, be applied to other system layouts.

A multimedia channel, e.g. a mobile TV channel, consists, in FIG. 7 of a channel source or live engine that produces and sends RTP packets with multimedia or media content. The channel switch preferably creates two RTP streams or sessions per channel, one for the video data and one for the audo data. Each such RTP session preferably handles both the actual media data forwarding, i.e. RTP traffic, and the control data forwarding, i.e. RTCP traffic. As a consequence, four ports per channel are typically allocated. In the prior art, it is conventional that the four port numbers are contiguous and start with the video data at a port number equal to 0 modulo 4. A typical example would then be port number 10 000 for video RTP, 10 001 for video RTCP, 10 002 for audio RTP and 10 003 for audio RTCP. The different channels are typically identified with their RTP video port numbers.

The available multimedia data (video and audio RTP/RTCP) are continuously delivered to the channel switch and where each such multimedia data stream or channel has a unique identifier, e.g. the port number of the video RTP.

A user wants to watch e.g. a TV program by means of his user terminal that could be a mobile telephone, personal digital assistance (PDA) or some other (mobile) communications terminal. The user enters a web page of the application server using his/her user terminal and typically clicks on a link to the desired TV program. The link clicking sends a channel request, e.g. a HTTP-based channel request, to the application server. The server then provides a (unique) identifier for the user terminal. This identifier provision can be realized by receiving the terminal identifier from the user terminal, e.g. together with the channel request. Alternatively, the application server generates the identifier itself, e.g. by selecting a free non-used identifier from a pool of available terminal identifier that is used by the application server for its connected user terminals.

The application server then compiles and sends a start session command to the channel switch. This command comprises the received or assigned identifier of the user terminal and the identifier of the requested multimedia channel. If the channel identifiers are in the form of video RTP ports, the application server has access to a list or set containing the available video RTP ports. The application server then identifies the correct channel port (identifier) based on the channel request from the user terminal.

The start session command preferably also comprises information on the input ports of the streaming server to which the channel switch should forward the multimedia data. As has been discussed above, a multimedia channel could include four parallel data streams. This means that preferably four input ports of the streaming server are selected and notified by the application server. This further requires that the application server has access to information on the input port numbers of the streaming server and keeps updated information on whether they are currently used or free.

The channel switch optionally replies with an acknowledge message or OK reply.

The application server further creates a Session Description Protocol (SDP) file and uploads it to the streaming server. This is an ordinary SDP file for live streaming but is specific in two ways. The SDP file contains the identifier of the user terminal. This could be realized by including the user terminal identifier in its name, e.g. j09184j0ajk.spd, where j09184j0ajk is the assigned user terminal identifier. In addition, the SDP file preferably also comprises information on the input ports of the streaming server to which the channel switch is commanded to send the RTP streams with the multimedia data. The streaming server optionally replies with an acknowledgement message.

The application server then, or before or simultaneously with previous control data exchange, generates the multimedia session set-up description of the present invention and sends it to the user terminal. The set-up description preferably includes the user terminal identifier created or selected by the application server, unless provided by the terminal itself. This set-up description is, as has been thoroughly discussed in the foregoing, preferably a complete description of the required instructions, objects and information that the user terminal requires to present the multimedia to the user and enable the efficient and user-friendly channel exchange of the invention. The user terminal and the streaming server then negotiate and perform a RTSP session set-up according to prior art techniques. The user terminal also processes the received session set-up description to display the multimedia session window on its display screen and activate the associations between its user inputs, e.g. keys, and identifiers of the other available multimedia channel(s).

The channel switch furthermore delivers the requested RTP stream to the input ports of the streaming server that the application server has selected. In addition, the user terminal identifier is also sent to the streaming server for allowing the server to identify to which user terminal (input port(s)) it should forward the multimedia data. If the streaming server already has this information, e.g. received previously from the application server, the RTP stream does not need to contain the user terminal identifier. Finally, the streaming server forwards the received multimedia (RTP) stream to the user terminal for display in the window session window and play out in a loudspeaker of the user terminal (see loudspeaker 16 of FIG. 2). The session set-up has now been completed and the multimedia rendering and play out has been initiated in the user terminal.

During the ongoing session, the user terminal can periodically, intermittently or at pre-defined time instances send update requests to the application server together with its terminal identifier. These update requests can be used by the application server as confirmations that the multimedia session is still active. In addition, when replying to the update requests, the application server can send new information that is used by the objects of the set-up description and the user terminal for updating the multimedia session window. For example, the actual TV program or movie sent on a given multimedia channel can change during time. The update response may then include information that is entered in the title region of the multimedia session window. Furthermore, the identifiers or icons of the alternative channels displayed in the channel region could change over time, especially if the identifiers correspond to the TV-program or movie that is currently available on the other channel(s). Also the number of available channels could change during a multimedia session. In such a case, the update reply could include the identifier (link) and icons of this new channel for display in the channel region and for association with one of the user input in the terminal.

Figure 8:
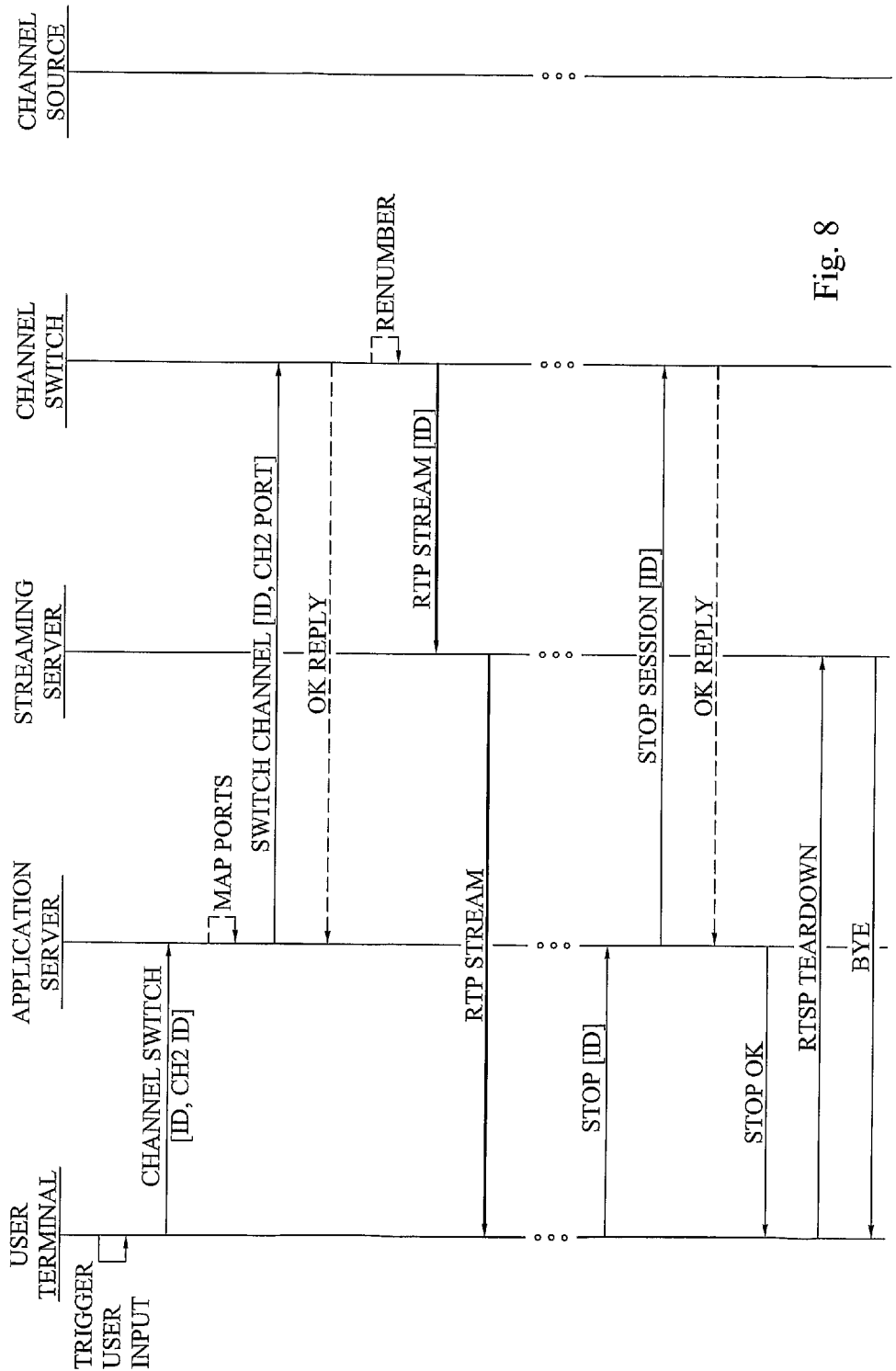
FIG. 8 is a signal diagram illustrating a multimedia channel switch according to an embodiment of the present invention and a multimedia session teardown.

FIG. 8 is a continuation of the signal diagram of FIG. 7 and illustrates the data signaling during a channel switch and in the session ending. The user of the terminal wants to watch some other TV-program or movie and therefore triggers the user input of the terminal that is associated with this desired multimedia channel. The request object of the set-up description then generates a channel switch request that is sent to the application server. This request includes the user terminal identifier that is used by the application server to identify the ongoing multimedia session. In addition, the request contains information allowing the server to identify the new multimedia channel. This channel information could e.g. be the port number of the RTP video port for this multimedia channel. Alternatively, it is some other information, e.g. name/title of channel or program/movie that is currently displayed on the channel. The application server then preferably identifies the relevant RTP video port for the new channel based on this information.

The application server preferably performs a port mapping based on the information in the switch request. Thus, the application server identifies the input ports of the streaming server that are assigned to the present user terminal. The server then compiles and transmits a channel switch command to the channel switch. This command comprises information on the new multimedia channel, preferably the RTP video port of this channel. Furthermore, the command could include the identifier of the user terminal for allowing the channel switch to identify the input ports of the streaming server, to which multimedia data of the new channel should be sent. Alternatively, or in addition, the application server sends information on these server input port directly to the channel switch. The switch may optionally reply with an acknowledgement message.

The channel switch preferably performs a renumbering of the sequence numbers and an assignment of time stamps to the multimedia (video and audio) data packets to form a continuous multimedia data stream (which typically can be regarded as composed of four parallel streams), as discussed in the foregoing. In a preferred implementation, the channel switch also sets or adds the ssrc value in/to the data packets to get the impression that the data packets are part of one continuous data stream. In this context, the ssrc field in the header of the data packets preferably has the same ssrc value. The renumbered, time stamped and ssrc-modified data packets of the RTP stream are sent, preferably together with the user terminal identifier, to the notified input ports of the streaming server. The server then forwards the data of the new channel to the user terminal.

The channel switch according to the present invention is, thus, completely transparent to the user terminal and the streaming server, which both operate as the multimedia stream of the ongoing session originates from a single multimedia source despite the change of channels and sources.

When the user wants to terminate the session, the user terminal sends a session stop message to the application server together with its user terminal identifier. The application server generates and forwards a session stop command with the terminal identifier to the channel switch. This switch then deletes the current user terminal from its list of current active sessions and user terminals. An optional acknowledgement reply is returned to the server that forwards a session termination reply to the user terminal. The RTSP session is then ended according to prior art signaling (RTSP teardown message from terminal to streaming server and reply message sent the other way around).

As is evident from the discussion above and is further illustrated in FIGS. 7 and 8, the user terminal identifier is preferably not only employed as an identifier of the particular user terminal but is also employed by the application server, channel switch and streaming server for identifying the current multimedia session involving the user terminal.

FIG. 11 is a schematic block diagram of a possible implementation of a multimedia provider 100 according to an embodiment of the present invention. In this illustrative embodiment the multimedia provider 100 is composed of an application server 110 and a channel switch 130 (compare to FIG. 6).

The application server 110 comprises a general input and output (I/O) unit 111 for managing communication with external units. This I/O unit is in particular adapted for receiving channel requests and channel switch requests from user terminals participating or is about to participate in a multimedia session with the multimedia provider 100. The I/O unit 111 furthermore transmits the session set-up description according to the present invention to user terminal in response to the channel requests. The I/O unit 111 also manages all the internal communication between the application server 110 and the channel switch 130, including e.g. session start commands and replies, SDP messages and replies, channel switch commands and replies and session end commands and replies. Any communication with the user terminals during an ongoing session, e.g. update requests and replies, are also performed through this I/O unit 111.

The application server 110 also includes an identifier provider 112 that provides identifiers for user terminals upon request of channel requests therefrom. In a first embodiment of the invention, this identifier provider 112 retrieves the terminal identifier from the channel request from the user terminal. This means that used terminal identifier is set by the user terminal or some other network unit or operator and is assigned to the terminal. In an alternative embodiment, the application server 110 has access to a pool of user terminal identifiers stored e.g. in a database 115. The identifier provider then selects one of these identifiers that is currently not employed by any other user terminal and uses it for the present user terminal. Other solutions for generating and providing terminal identifiers could also be performed by the provider 112 and is within the scope of the present invention. The identifier provider 112 is preferably also configured for retrieving terminal identifiers from other messages originating from the user terminal, e.g. from the channel switch request, update request and session end request.

A set-up description generator or engine 113 is implemented in the application server 110 for generating a multimedia session set-up description of the invention based on the channel request received by the I/O unit 111. This set-up description includes the previously defined multimedia object, association object and request object that are processable in the user terminal. The set-up description could be compiled in any of the previously mentioned languages. The generator 113 generates the set-up description on demand and based on the channel request from the user. This means that the multimedia object of the set-up description preferably starts, when processed in the terminal, by rendering multimedia data of the requested channel once the session has been set up. Furthermore, the generator 113 preferably receives the user terminal identifier from the identifier provider 112 and uses it when generating the set-up description. The completed set-up description is then transmitted to the user terminal by the I/O unit 111.

The description generator 113 or some other unit of the application server 110 can generate and send, using the I/O unit 111, relevant update information that is to be displayed in the session window of the user terminal.

A message engine 116 of application server 110 generates different control messages that are sent to the channel switch 130 and the user terminal during the set-up procedure, during the ongoing session and at the session termination. This message engine 116 is typically adapted for including the user terminal identifier (from the identifier provider 112) in its generated messages.

Upon reception of a channel switch command from the user terminal, the message engine 116 compiles a channel switch command comprising identifier of the user terminal (session) and the new channel and sends it to the channel switch.

The channel switch 130 likewise has an I/O unit 131 for communicating with the application server 110, the user terminal and any other relevant external unit. A session negotiator 134 can in this embodiment be provided in the channel switch 130, or alternatively can at least some of the functionality of the negotiator 134 be implemented in the application server 110. This negotiator 134 performs the necessary communication with the user terminal in order to set up a multimedia (RTSP) session. The operation of this negotiator 134 is according to prior art techniques and is not described further herein.

The switch 130 includes a channel source selector 133 that selects a multimedia source 210, 220, from which multimedia data is to be sent to a user terminal. This source selector 133 receives information from (the message engine 116 of) the application server 110 identifying the relevant multimedia source 210, 220, typically in the form of the port number of the RTP video stream for this source 210, 220. The I/O unit 131 then forwards multimedia data from the selected connected multimedia source 210, 220 to the user terminal for rendering in the multimedia display region and possibly playing out in a loudspeaker.

The channel switch 130 preferably also comprises list(s) identifying those user terminals that are currently receiving multimedia data from the different media sources 210, 220. A unit/module (not illustrated) for managing and updating the list(s) is then preferable included in the switch 130.

Upon reception of a channel switch command from the message engine 116 in the application server 110, the source selector 133 identifies the new channel source 210, 220 that should be selected and used for the user terminal. The data packets from this new source 210, 220 preferably first passes a packet renumberer 132 implemented in the channel switch 130 to manage the multimedia stream in order to provide a continuous and seamless output stream (actually several parallel streams). This renumberer 132 is, thus, configured for renumbering the data packets, in particular, during and following the channel switch to form contiguous sequence numbers. Furthermore, the packet renumberer 132 also preferably assigns time stamps to the multimedia data packets to further enhance the seamlessness of the channel switch. The packet renumberer 132 could also add or modify the ssrc values of the data packets. The terminal list(s) of the channel switch 130 is (are) also updated following the channel switch.

The units 111-113, 116, 131-134 of the application server 110 and the channel switch 130 of the multimedia provider 100 may be provided as software, hardware or a combination thereof. The units 111-116 of the application server 110 may be implemented together in a network node. Also a distributed implementation is possible with some of the units provided in different network nodes. The units 131-134 of the channel switch 130 may be implemented together in a network node. Also a distributed implementation is possible with some of the units provided in different network nodes. It is further anticipated by the invention that the application server 110, channel switch 130 and the multimedia sources 210, 220 may be all, arranged together in a single network node or can be provided in different network nodes in the unicast communications system.

FIG. 12 is a schematic block diagram of a possible implementation of a multimedia provider 100 according to another embodiment of the present invention. In this illustrative embodiment the multimedia provider 100 is composed of an application server 110, a streaming server 120 and a channel switch 130 (compare to F*ig*. 5).

The operation of the I/O unit 111, identifier provider 112, description generator 113, message engine 116 of the application server 110 and the I/O unit 131, packet renumberer 132 and source selector 133 of the channel switch 130 is similar to the corresponding units described above in connection with FIG. 12 and is not repeated herein.

It is evident to a skilled person that some of the message generated by the message engine 116 is, in this embodiment, sent to the streaming server 120 instead of the channel switch 130 as in FIG. 11. For example, the SDP message is generated by the message engine 116, e.g. based on SDP templates stored in the database 115, and is sent to the streaming server 120.

The port mapper 114 of the application server 110 is configured for selecting the output port(s) of the channel switch 130 and the input port(s) of the streaming server that are to be used for a streaming session with a user terminal. Information on the available ports and updated information on whether they are occupied or free can preferably be obtained from the database 115 or some other information source.

The streaming server 120 includes an I/O unit 121 for conducting communication with the application server 110, the channel switch 131 and the user terminal. This I/O unit 121 in particular receives multimedia data from the channel switch and forwards it to the user terminal. A session negotiator 124 is implemented in the server 120 for performing the (RTSP) session set-up negotiation with the user terminal. The operation of this unit is similar to the corresponding unit implemented in the channel switch in FIG. 11 and is not further described herein.

The units 111-114, 116, 121, 124, 131-134 of the application server 110, streaming server 120 and the channel switch 130 of the multimedia provider 100 may be provided as software, hardware or a combination thereof. The units 111-116 of the application server 110 may be implemented together in a network node. Also a distributed implementation is possible with some of the units provided in different network nodes. The units 121 and 124 of the streaming server 120 may be implemented together in a network node. Also a distributed implementation is possible with some of the units provided in different network nodes. The units 131-134 of the channel switch 130 may be implemented together in a network node. Also a distributed implementation is possible with some of the units provided in different network nodes. It is further anticipated by the invention that the application server 110, streaming server 120, channel switch 130 and the multimedia sources 210, 220 may be all arranged together in a single network node or can be provided in different network nodes in the unicast communications system.

FIG. 13 is a schematic block diagram of a user terminal 10 embodying an aspect of the present invention. This user terminal 10 comprises an I/O unit 11 for communicating with a multimedia provider (application server and streaming server or application server and channel switch). This I/O unit 11 is in particular adapted for transmitting a channel request and a channel switch request to the application server. The I/O unit 11 also receives the multimedia session set-up description of the invention from the application server and, of course, multimedia data from the streaming server or channel switch.

The user terminal 10 further includes a multimedia or media player 18 for rendering the received multimedia data. This multimedia player 18 is preferably in communication with a display screen 12 and a loudspeaker of the terminal 10 for displaying and playing out the media thereon. The media player 18 also comprises a processor for processing the multimedia object provided in the received set-up description. This multimedia object processing leads to a display of the multimedia session window on the connected display screen 12, which is more clearly illustrated in FIG. 2. The object processor 13 preferably also processes update information received from the multimedia provider to adapt the displayed session window based on this new updated information.

An association object processor 15 is arranged for processing the association object of the set-up description to provide the binding or association between the user inputs 14 of the terminal with the alternative available channels, identifiers or icons of which are displayed in the channel region of the multimedia session window.

A request processor 19 is implemented in the user terminal 10 for generating the channel and channel switch requests. This processor 19 is then preferably configured for accessing a web page of the multimedia provider to download the session set-up description of the invention and select the desired multimedia channel. A request object processor 17 is implemented in the request processor 19 for generating the channel switch commands. This processor 17 receives input information upon a user-initiated triggering of one of the user inputs 14 (keys) of the terminal 10. Through the association between the user input 14 and an identifier of the requested channel as enabled by the association object processor 15, the request object includes this channel identifier in the channel switch message. Also the identifier of the user terminal is included in the switch message.

The user terminal identifier could have been assigned by the multimedia provider and received therefrom. In such a case, the identifier is stored in a memory location 30 of the terminal. For other types of identifiers, the identifier source 30 could be other types of units than a memory, e.g. a Subscriber Identity Module (SIM).

The units 11, 13, 15, 17-19, 30 of the user terminal may be provided as software, hardware or a combination thereof. The multimedia object processor 13 can be implemented in the multimedia player 18 as is illustrated in the figure or in another location in the terminal 10. The same principles apply to the request object processor 17 and the request processor.

It will be understood by a person skilled in the art that various modifications and changes may be made to the present invention without departure from the scope thereof, which is defined by the appended claims.

The invention claimed is:

1. A multimedia session managing method in a unicast-based communications system, said method comprising:
   a multimedia provider generating, based on a request for a first multimedia channel from a user terminal and over said unicast-based communications system, a multimedia session set-up description comprising:
   i) a multimedia object defining, when processed in said user terminal, a displayable multimedia session window in a user interface of said user terminal, said multimedia session window comprising a multimedia display region adapted for displaying multimedia data of a requested multimedia channel and a displayable channel region comprising information on a second different multimedia channel;
   ii) an association object defining, when processed in said user terminal, an association of a user input of said user terminal with a channel identifier of said second different multimedia channel and a user terminal identifier of said user terminal; and
   iii) a request object generating, upon a user-triggering of said user input, a request for said second different multimedia channel, said request comprising said user terminal identifier and said channel identifier of said second different multimedia channel;
   said multimedia provider transmitting said multimedia session set-up description to said user terminal over said unicast-based communications system;
   said multimedia provider starting a multimedia session over said unicast-based communications system with said user terminal;
   said multimedia provider receiving, from said user terminal over said unicast-based communications system, said request for said second different multimedia channel;
   said multimedia provider switching, based on said user terminal identifier and said channel identifier of said second different multimedia channel, multimedia data of said first multimedia channel to a multimedia data of said second different multimedia channel; and
   said multimedia provider providing said multimedia data of said second different multimedia channel to said user terminal during said multimedia session over said unicast-based communications system for display in said multimedia display region of said user terminal,
   wherein said multimedia provider is implemented in hardware or in a combination of hardware and software.

2. The method according to claim 1, wherein said providing step comprises said multimedia provider providing said multimedia data of said first multimedia channel and said multimedia data of said second different multimedia channel to said user terminal as a continuous stream of data packets, where a first portion of said data packets of said stream comprises multimedia data of said first multimedia channel and a second subsequent portion of said data packets of said stream comprises multimedia data of said second different multimedia channel.

3. The method according to claim 2,
   wherein each data packet is associated with a sequence number, and
   wherein said providing step comprises said multimedia provider assigning sequence numbers to data packets comprising multimedia data associated with said second different multimedia channel so that the data packets of said stream have a continuous sequence numbering.

4. The method according to claim 2,
   wherein each data packet is associated with a time stamp, and
   wherein said providing step comprises said multimedia provider assigning time stamps to data packets comprising multimedia data associated with said second different multimedia channel so that the data packets of said stream have a continuous time stamping.

5. The method according to claim 2,
wherein said multimedia data comprises video data and audio data, and
wherein said providing step comprises:
said multimedia provider assigning time stamps to data packets comprising audio data associated with said second different multimedia channel so that the data packets of said stream that comprise audio data have a continuous time stamping; and
said multimedia provider assigning time stamps to data packets comprising video data associated with said second different multimedia channel based on the assigned time stamps of said data packets comprising audio data.

6. The method according to claim 2, wherein said providing step comprises said multimedia provider assigning a same synchronization source, ssrc, value to data packets comprising multimedia data associated with said second different multimedia channel as the ssrc value of the data packets comprising multimedia data associated with said first multimedia channel.

7. The method according to claim 2,
wherein said multimedia data of said first multimedia channel comprises first video data from a first video source and first audio data from a first data source,
wherein said multimedia data of said second different multimedia channel comprises second video data from a second video source and second audio data from a second data source,
wherein said first video source is different from said second video source, and said first audio source is different from said second audio source, and
wherein in said providing step, said first portion of said continuous stream of data packets comprises both said first video data and said first audio data, and said second subsequent portion of said continuous stream of data packets comprises both said second video data and second first audio data.

8. The method according to claim 1, wherein said user terminal identifier is utilized by said multimedia provider as identifier of said user terminal and as identifier of said multimedia session.

9. The method according to claim 1, wherein said multimedia provider comprises an application server and a streaming server, said method further comprising:
said application server providing, based on said request for said first multimedia channel, said user terminal identifier;
said application server forwarding said user terminal identifier and a channel identifier of said first multimedia channel to said streaming server; and
said streaming server setting up, based on said user terminal identifier, the multimedia session with said user terminal.

10. The method according to claim 9, wherein said multimedia provider further comprises a channel switch, said method further comprising:
said application server determining, based on said user terminal identifier and said channel identifier of said second different multimedia channel received in said request for said second different multimedia channel, at least one input port of said streaming server assigned to said multimedia session and at least one output port of said channel switch assigned to provide multimedia data of said second different multimedia channel; and said application server forwarding information on said at least one input port and said at least one output port to said channel switch.

11. The method according to claim 1, wherein said request object comprises a hyperlink pointing to said multimedia provider and said request for said second different multimedia channel is a HyperText Transfer Protocol, HTTP, request that comprises said user terminal identifier and said channel identifier of said second different channel.

12. The method according to claim 11, wherein said hyperlink comprises said user terminal identifier and said channel identifier of said second different multimedia channel.

13. The method according to claim 1, wherein said user input is a key on said user terminal.

14. The method according to claim 1, wherein said multimedia session set-up description comprises at least one of:
a Synchronized Multimedia Integration Language, SMIL, based description;
a HyperText Markup Language, HTML, based description;
an Extensible Markup Language, XML, based description;
a Session Initiation Protocol, SIP, based description; and
a Message Session Relay Protocol, MSRP, based description.

15. The method according to claim 1, wherein said displayable multimedia session window further comprises a displayable information region comprising an identifier of a multimedia channel, the multimedia data of which is displayed in said multimedia display region.

16. The method according to claim 1, wherein said user terminal identifier comprises at least one of:
a unique user terminal identifier assigned by said multimedia provider;
a Universal Resource Identifier, URI, of said user terminal;
an Internet Protocol, IP, address of said user terminal; and
at least one IP port of said user terminal.

17. The method according to claim 1, further comprising said multimedia provider assigning said user terminal identifier selected from a pool of available user terminal identifiers.

18. The method according to claim 1, wherein said multimedia data of said second different multimedia channel is provided to said user terminal so as to be displayable in said multimedia display region as defined by said multimedia object provided by said multimedia provider in response to said request for the first multimedia channel.

19. A multimedia provider, comprising:
an application server structured to generate, based on a request for a first multimedia channel from a user terminal sent over a unicast-based communications system, a multimedia session set-up description comprising:
i) a multimedia object defining, when processed in said user terminal, a displayable multimedia session window in a user interface of said user terminal, said multimedia session window comprising a multimedia display region adapted for displaying multimedia data of a requested multimedia channel and a displayable channel region comprising information on a second different multimedia channel;
ii) an association object defining, when processed in said user terminal, an association of a user input of said user terminal with a channel identifier of said second different multimedia channel and a user terminal identifier of said user terminal; and
iii) a request object generating, upon a user-triggering of said user input, a request for said second different multimedia channel, said request comprising said user terminal identifier and said channel identifier of said second different multimedia channel;

the application server also being structured to
transmit said multimedia session set-up description to said user terminal over said unicast-based communications system, and
receive from said user terminal over said unicast-based communications system, said request for said second different multimedia channel;

a streaming server structured to start a multimedia session over said unicast-based communications system with said user terminal; and a channel switch structured to switch, based on said user terminal identifier and said channel identifier of said second different multimedia channel, multimedia data of said first multimedia channel to a multimedia data of said second different multimedia channel, wherein the streaming server is structured to provide said multimedia of said second different multimedia channel to said user terminal during said multimedia session over said unicast-based communications system for display in said multimedia display region of said user terminal, wherein the multimedia provider is implemented in hardware or in a combination of hardware and software.

20. The multimedia provider according to claim 19, wherein said channel switch is structured to provide said multimedia data of said first multimedia channel and said multimedia data of said second different multimedia channel to said user terminal as a continuous stream of data packets, and wherein a first portion of said data packets of said stream comprises multimedia data of said first multimedia channel and a second subsequent portion of said data packets of said stream comprises multimedia data of said second different multimedia channel.

21. The multimedia provider according to claim 20, wherein each data packet is associated with a sequence number, and wherein said channel switch comprises a packet renumberer structured to assign sequence numbers to data packets comprising multimedia data associated with said second different multimedia channel so that the data packets of said stream have a continuous sequence numbering.

22. The multimedia provider according to claim 20, wherein said application server comprises:

an identifier provider structured to provide, based on said request for said first multimedia channel, said, said user terminal identifier; and an input and output unit structured to forward said user terminal identifier and a channel identifier of said first multimedia channel to said streaming server, and wherein said streaming server comprises a session negotiator structured to set up, based on said user terminal identifier, the multimedia session with said user terminal.

23. The multimedia provider according to claim 22, wherein said application server further comprises:

a port mapper structured to determine, based on said user terminal identifier and said channel identifier of said second different multimedia channel received in said request for said second different multimedia channel, at least one input port of said streaming server assigned to said multimedia session and at least one output port of said channel switch assigned for providing multimedia data of said second different multimedia channel, and wherein said input and output unit is structured to forward information on said at least one input port and said at least one output port to said channel switch.

24. The multimedia provider according to claim 19, wherein each data packet is associated with a time stamp, and wherein said channel switch comprises a packet renumberer structured to assign time stamps to data packets comprising multimedia data associated with said second different multimedia channel so that the data packets of said stream have a continuous time stamping.

25. The multimedia provider according to claim 24, wherein said multimedia data comprises video data and audio data, and wherein said channel switch is structured to
assign time stamps to data packets comprising audio data associated with said second different multimedia channel so that the data packets of said stream that comprise audio data have a continuous time stamping, and
assign time stamps to data packets comprising video data associated with said second different multimedia channel based on the assigned time stamps of said data packets comprising audio data.

26. The multimedia provider according to claim 19, wherein said channel switch comprises a packet renumberer structured to assign a same synchronization source, ssrc, value to data packets comprising multimedia data associated with said second different multimedia channel as the ssrc value of the data packets comprising multimedia data associated with said first multimedia channel.

27. The multimedia provider according to claim 19, wherein said multimedia provider utilizes said user terminal identifier as an identifier of said user terminal and as an identifier of said multimedia session.

28. The multimedia provider according to claim 19, wherein said request object comprises a hyperlink pointing to said multimedia provider and said request for said second different multimedia channel is a HyperText Transfer Protocol, HTTP, request that comprises said user terminal identifier and said channel identifier of said second different multimedia channel.

29. The multimedia provider according to claim 28, wherein said hyperlink comprises said user terminal identifier and said channel identifier of said second different multimedia channel.

30. The multimedia provider according to claim 19, wherein said multimedia session set-up description comprises at least one of:

a Synchronized Multimedia Integration Language, SMIL, based description;
a HyperText Markup Language, HTML, based description;
an Extensible Markup Language, XML, based description;
a Session Initiation Protocol, SIP, based description; and
a Message Session Relay Protocol, MSRP, based description.

31. The multimedia provider according to claim 19, wherein said displayable multimedia session window further comprising a displayable information region comprising an identifier of a multimedia channel, the multimedia data of which is displayed in said multimedia display region.

32. The multimedia provider according to claim 19, wherein said user terminal identifier comprises at least one of:

a unique user terminal identifier assigned by said application server;

a Universal, Resource Identifier, URI, of said user terminal;

an Internet Protocol, IP, address of said user terminal; and at least one IP port of said user terminal.

33. The multimedia provider according to claim 19, wherein said application server is further structured to assign an identifier of said user terminal selected from a pool of available user terminal identifiers.

34. A network node comprising a multimedia provider according to claim 19.

35. The multimedia provider according to claim 19, wherein said channel switch is structured to provide said multimedia data of said second different multimedia channel to said user terminal so as to be displayable in said multimedia display region as defined by said multimedia object provided by said application server in response to said request for the first multimedia channel.

36. A user terminal, comprising:
  an input and output unit structured to
    transmit a request for a first multimedia channel to a multimedia provider over a unicast-based communications system, and
    receive from said multimedia provider over said unicast-based communications system, a multimedia session set-up description generated based on said request for said first multimedia channel, said multimedia session set-up description comprising a multimedia object, an association object, and a request object;
  a multimedia object processor structured to process said multimedia object to provide a multimedia session window displayable in a user interface of said user terminal, said multimedia session window comprising a multimedia display region adapted for displaying multimedia data of a requested multimedia channel and a displayable channel region comprising information on a second different multimedia channel;
  an association object processor structured to process said association object to provide an association of a user input of said user terminal with a channel identifier of said second different multimedia channel and a user terminal identifier of said user terminal; and
  a request object processor structured to process said request object to generate, upon a user-triggering of said user input, a request for said second different multimedia channel, said request comprising said user terminal identifier and said channel identifier of said second different multimedia channel,
  wherein the input and output unit is structured to receive multimedia data of the first multimedia channel from the multimedia provider in a multimedia session over the unicast-based communications system, the multimedia session having been established between the multimedia provider and the user terminal as a result of the input and output unit transmitting the request for the first multimedia channel, the multimedia data of the first multimedia channel being for display in the multimedia display region,
  wherein the input and output unit is structured to transmit the request for the second different multimedia channel generated by the request object processor, and subsequently receive multimedia data of the second different multimedia channel from the multimedia provider during the multimedia session over the unicast-based communications system, the multimedia data of the second different multimedia channel being for display in the multimedia display region, and
  wherein at least one of the input and output unit, the multimedia object processor, the association object processor, and the request object processor is implemented in hardware or in a combination of hardware and software such that the user terminal as a whole is implemented in hardware or in a combination of hardware and software.

37. The user terminal according to claim 36, further comprising a multimedia player structured to
  display said multimedia data of said first multimedia channel in said multimedia display region, and
  display said multimedia data of said second different multimedia channel in said multimedia display region.

* * * * *

UNITED STATES PATENT AND TRADEMARK OFFICE
CERTIFICATE OF CORRECTION

| | | |
|---|---|---|
| PATENT NO. | : 9,003,041 B2 | Page 1 of 1 |
| APPLICATION NO. | : 11/666891 | |
| DATED | : April 7, 2015 | |
| INVENTOR(S) | : Einarsson et al. | |

It is certified that error appears in the above-identified patent and that said Letters Patent is hereby corrected as shown below:

Specification

In Columns 2 & 3, Lines 63-67 & 1-12, delete "A……………………web page.".

In Column 8, Line 33, delete "screen 10." and insert -- screen 12. --, therefor.

In Column 8, Line 43, delete "screen 22" and insert -- screen 12 --, therefor.

In Column 10, Line 2, delete "input 10" and insert -- input 14 --, therefor.

In Column 11, Line 48, delete "http://smiltv.com/ch/userID/channelID.txt" and insert -- http://smiltv.com/ch/userID/channelID.txt. --, therefor.

In Column 12, Line 64, delete "S 11." and insert -- S11. --, therefor.

In Column 14, Line 51, delete "120." and insert -- 10. --, therefor.

In Column 15, Line 24, delete "audo" and insert -- audio --, therefor.

In Column 20, Line 10, delete "all," and insert -- all --, therefor.

In Column 20, Line 41, delete "131" and insert -- 130 --, therefor.

Claims

In Column 27, Line 1, in Claim 32, delete "Universal," and insert -- Universal --, therefor.

In Column 28, Line 13, in Claim 36, delete "having been" and insert -- have been --, therefor.

Signed and Sealed this
Thirteenth Day of October, 2015

Michelle K. Lee
*Director of the United States Patent and Trademark Office*